(12) United States Patent
Maeda et al.

(10) Patent No.: US 10,839,237 B2
(45) Date of Patent: Nov. 17, 2020

(54) ILLUMINATION APPARATUS

(71) Applicant: FUJITSU LIMITED, Kawasaki (JP)

(72) Inventors: Satoshi Maeda, Atsugi (JP); Yukihiro Abiko, Kawasaki (JP); Soichi Hama, Atsugi (JP); Satoshi Semba, Kawasaki (JP); Hajime Nada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 209 days.

(21) Appl. No.: 15/785,590

(22) Filed: Oct. 17, 2017

(65) Prior Publication Data

US 2018/0114080 A1 Apr. 26, 2018

(30) Foreign Application Priority Data

Oct. 21, 2016 (JP) .................................. 2016-207219

(51) Int. Cl.
*G06K 9/00* (2006.01)
*G06K 9/20* (2006.01)

(52) U.S. Cl.
CPC ....... *G06K 9/00885* (2013.01); *G06K 9/0004* (2013.01); *G06K 9/2027* (2013.01); *G06K 9/2036* (2013.01); *G06K 9/00013* (2013.01); *G06K 9/00087* (2013.01)

(58) Field of Classification Search
None
See application file for complete search history.

(56) References Cited

U.S. PATENT DOCUMENTS

| | | | |
|---|---|---|---|
| 5,446,290 A | | 8/1995 | Fujieda et al. |
| 5,497,390 A | * | 3/1996 | Tanaka .................. B82Y 20/00 372/27 |
| 6,965,685 B1 | | 11/2005 | Smith |
| 2008/0247167 A1 | | 10/2008 | Matsubara et al. |
| 2009/0028396 A1 | | 1/2009 | Kishima |
| 2015/0252980 A1 | * | 9/2015 | Maeda ............... G06K 9/00013 382/115 |

(Continued)

FOREIGN PATENT DOCUMENTS

| | | |
|---|---|---|
| EP | 3001349 | 3/2016 |
| JP | 2005-527874 | 9/2005 |
| JP | 2008256822 A | 10/2008 |

(Continued)

OTHER PUBLICATIONS

Extended European Search Report dated Mar. 13, 2018 in Application No. 17197031.2.

(Continued)

*Primary Examiner* — Kevin Ky
(74) *Attorney, Agent, or Firm* — Staas & Halsey LLP

(57) ABSTRACT

A disclosed illumination apparatus includes first and second light sources that generate light for an illumination area to be illuminated; a first substrate on which the first and second light sources are mounted; and a second substrate that is disposed in an illumination direction of the light of the first and second light sources with respect to the first substrate, the second substrate having first and second diffraction grating elements formed integrally therewith, the first diffraction grating element being provided for the first light source, and the second diffraction grating element being provided for the second light source.

15 Claims, 23 Drawing Sheets

(56) References Cited

U.S. PATENT DOCUMENTS

2016/0209668 A1 7/2016 Maeda et al.
2017/0371202 A1* 12/2017 He .................... G02F 1/133528

FOREIGN PATENT DOCUMENTS

| JP | 2008311032 A | 12/2008 |
| JP | 2009-31903 | 2/2009 |
| JP | 2013-130981 | 7/2013 |
| JP | 2016-133905 | 7/2016 |
| WO | 2004/081852 | 9/2004 |

OTHER PUBLICATIONS

Patent Abstracts of Japan English Abstract for JP 2016-133905, published Jul. 25, 2016.
Espacenet English Abstract for JP 2009-031903, published Feb. 12, 2009.
Espacenet English Abstract for JP 2013-130981, published Jul. 4, 2013.
WIPO English Abstract for PCT Patent Application Publication No. 03/025836, published Mar. 27, 2003.
Notice of Reasons for Refusal, dated Sep. 8, 2020, in Japanese Application No. 2016207219 (7 pp.).

* cited by examiner

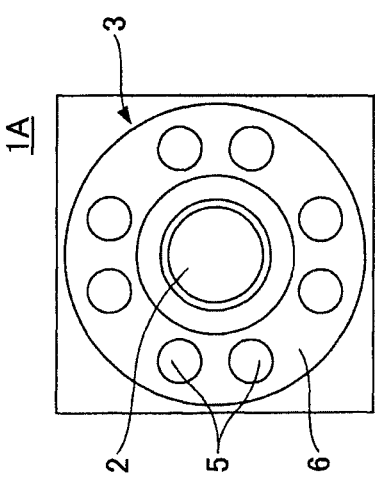
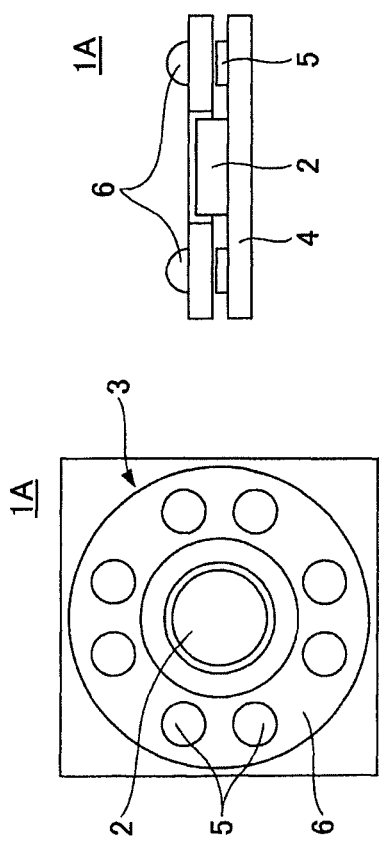
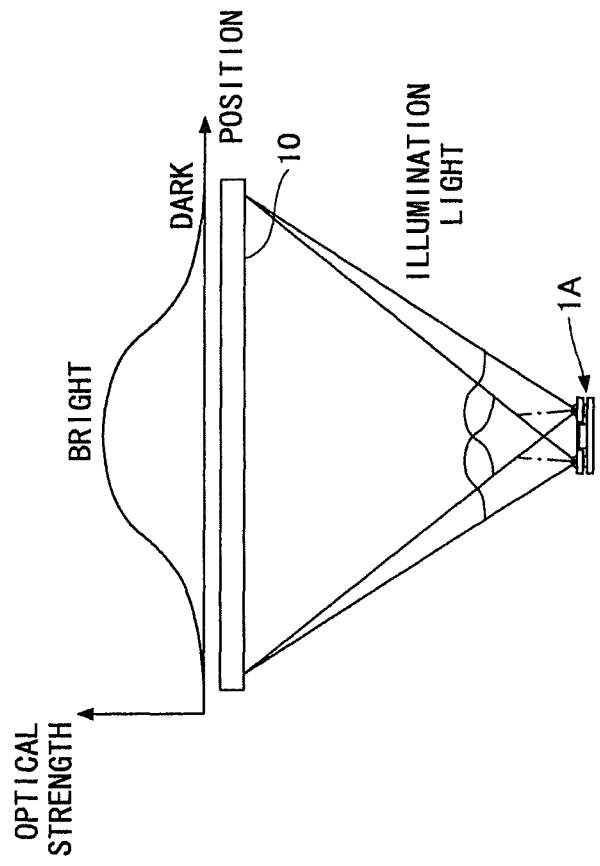
FIG.1A
FIG.1B
FIG.1C

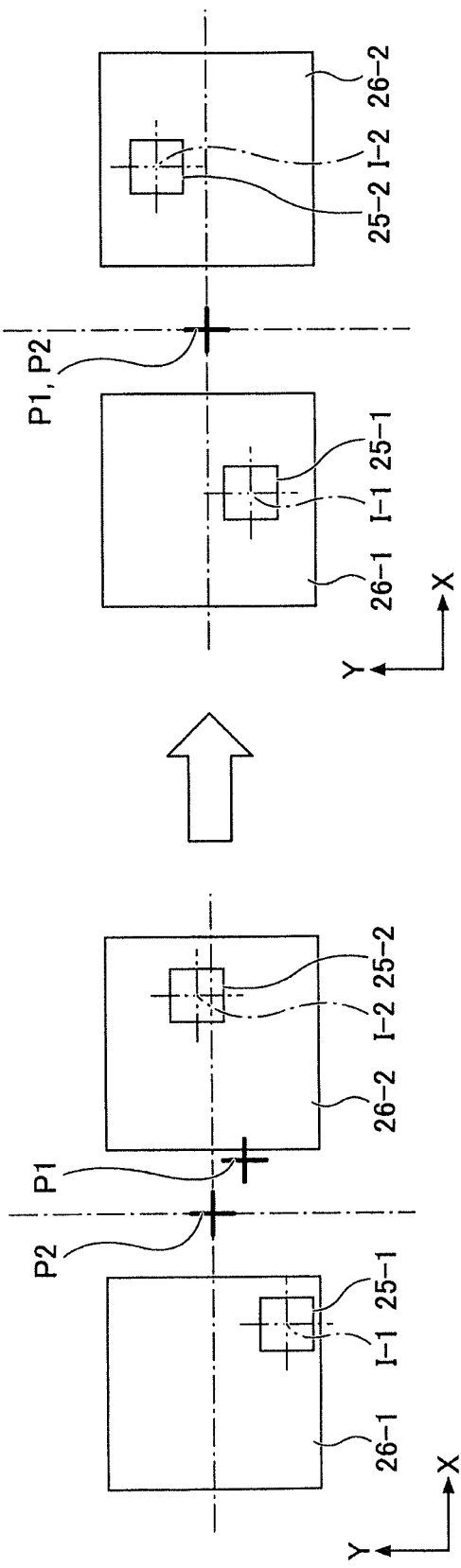

FIG.12

ILLUMINATION APPARATUS

CROSS-REFERENCE TO RELATED APPLICATIONS

This present application is based upon and claims the benefit of priority of the prior Japanese Patent Application No. 2016-207219, filed on Oct. 21, 2016, the entire contents of which are incorporated herein by reference.

FIELD

The disclosure is related to an illumination apparatus.

BACKGROUND

Recently, a biometric authentication technique has been developed for authenticating users of a system in a non-contact manner based on biometric images which represent biometric information such as a venous pattern of hands or fingers, patterns of fingerprints or palms. A biometric authentication apparatus using the biometric authentication technique checks input biometric information of the users against pre-registered biometric information of registered users. The biometric authentication apparatus regards the user whose biometric information corresponds to the registered biometric information as a registered user who has authorized rights, and permits the user to use the system.

The biometric authentication apparatus is used in various fields, such as management of logging on of PCs (Personal Computers), authentication at ATMs (Automated Teller Machine) of banks, management of entrance and exit at offices, etc.

In order to check the users with high accuracy with the biometric authentication apparatus, it is desired that contractual features of the biometric information are clearly captured in the biometric image. Therefore, a biometric authentication sensor for capturing the biometric information to generate the biometric image may include, in addition to an imaging optical system with which a subject including the biometric information such as a hand is captured by an imaging lens and an imaging element such as a CCD (Charge Coupled Device), an illumination optical system for illuminating the subject.

A technique for the biometric authentication sensor including the illumination optical system and the imaging optical system is proposed (Patent Documents 1, 2, 3 and 4, for example).

[Patent Document 1] Japanese Laid-open Patent Publication No. 2009-31903

[Patent Document 2] Japanese Laid-open Patent Publication No. 2013-130981

[Patent Document 3] Japanese National Publication of International Patent Application No. 2005-527874

[Patent Document 4] Japanese Laid-open Patent Publication No. 2016-133905

However, according to the prior art as described above, it is difficult to uniformly illuminate an illumination area with a plurality of light sources. For example, mounting accuracy of the light sources on a substrate is limited, and it is not guaranteed that the light sources are mounted precisely at designed positions. As a result, there may be a case where a relationship between the mounting positions of the light sources and the diffraction grating elements (diffractive optical elements) is not as designed, which reduces uniformity of illumination in the illumination area.

SUMMARY

According to one aspect, an illumination apparatus includes first and second light sources that generate light for an illumination area to be illuminated; a first substrate on which the first and second light sources are mounted; and a second substrate that is disposed in an illumination direction of the light of the first and second light sources with respect to the first substrate, the second substrate having first and second diffraction grating elements formed integrally therewith, the first diffraction grating element being provided for the first light source, and the second diffraction grating element being provided for the second light source.

The object and advantages of the embodiment will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIGS. 1A through 1C are diagrams explaining a first example of a biometric authentication sensor.

FIG. 11 is an explanatory view of a midpoint alignment.

FIG. 12 is a table illustrating a relationship between a light source mounting position error and an illumination distribution.

DESCRIPTION OF EMBODIMENTS

Figure 2A:
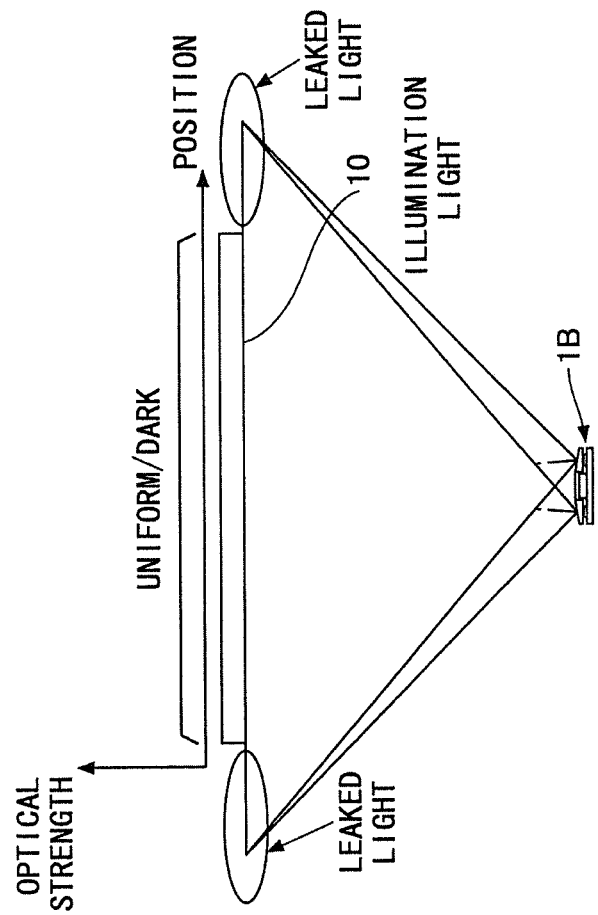
FIGS. 2A through 2C are diagrams explaining a second example of a biometric authentication sensor.

In the following, embodiments are described in detail with reference to appended drawings.

FIGS. 1A through 10 are diagrams explaining a first example of a sensor for a biometric authentication apparatus (referred to as "a biometric authentication sensor", hereinafter). FIG. 1A is a top view of the biometric authentication sensor, FIG. 1B is a schematic side view of the biometric authentication sensor, and FIG. 10 is a schematic diagram illustrating illumination light of the biometric authentication sensor and an illumination distribution. The biometric authentication sensor 1A includes an imaging optical system 2 such as a camera, and an illumination optical system 3. The illumination optical system 3 includes a plurality of LEDs (Light-Emitting Diodes) 5 (eight LEDs, in this example), which are provided on a substrate 4, and a lens array 6. In this example, as illustrated in FIG. 1A, the LEDs 5 are disposed in a ring arrangement around an outer side of the imaging optical system 2, and the lens array 6 is provided in a ring arrangement such that the lens array 6 is opposed to the LEDs 5.

As illustrated in FIG. 10, the lens array 6 causes the illumination light from the LEDs 5 to be spread (diffused), and the spread illumination light reaches an illumination area 10. As illustrated at its top in FIG. 10, strength of the illumination light (arbitrary unit) is varied according to positions (arbitrary unit) on the illumination area 10. In this example, the optical strength in a center portion of the illumination area 10 is higher than that in other portions of the illumination area 10. A distribution of light and dark regions generated in the illumination area 10 is determined according to an arrangement of the LEDs 5 and the characteristics of the lens array 6. It is difficult to make the optical strength of the illumination light uniform.

Figure 2B:
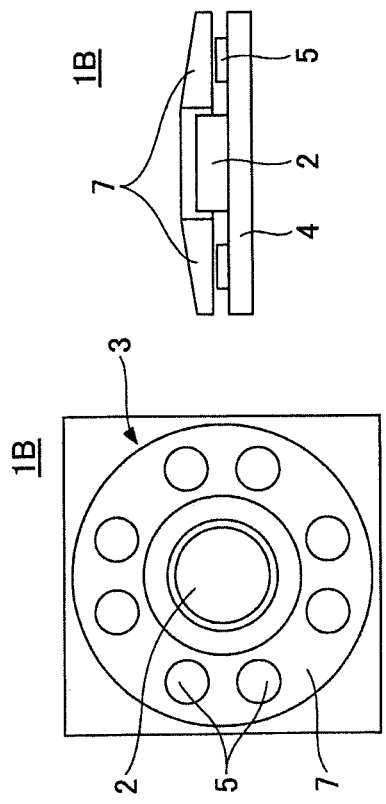
Figure 2C:
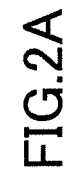

FIGS. 2A through 2C are diagrams explaining a second example of a biometric authentication sensor. FIG. 2A is a top view of the biometric authentication sensor, FIG. 2B is a schematic side view of the biometric authentication sensor, and FIG. 2C is a schematic diagram illustrating illumination light of the biometric authentication sensor and an illumination distribution. In FIGS. 2A through 2C, the same elements as illustrated in FIGS. 1A through 10 are given the same reference numbers, and an explanation thereof is emitted. The biometric authentication sensor 1B illustrated in FIGS. 2A through 2C differs from the biometric authentication sensor 1A in FIGS. 1A through 10 in that a diffuser light guide plate 7 is provided, instead of the lens array 6, in a ring form such that the diffuser light guide plate 7 is opposed to the LEDs 5. As illustrated in FIG. 2C, the diffuser light guide plate 7 causes the illumination light from the LEDs 5 to be diffused, and the diffused illumination light reaches an illumination area 10. As illustrated at the top in FIG. 2C, the strength of the illumination light (arbitrary unit) becomes uniform, regardless of the positions (arbitrary unit) on the illumination area 10. However, the diffused illumination light reaches a region other than the illumination area 10. As illustrated by regions in an ellipse in FIG. 2C, at the outside of the illumination area 10, losses due to leakage of the light increase, which causes the strength of the illumination light to be reduced. In order to prevent the reduction in the illumination light, solutions such as increasing the number of the LEDs 5, and using LEDs with higher output power may be contemplated; however, increasing the number of the LEDs 5 leads to upsizing of the illumination optical system 3. Further, using EDs with higher output power also leads to upsizing of the illumination optical system 3, because, in general, LEDs with higher output power are relatively large in size to compensate for the increased heat.

Therefore, embodiments described hereinafter are directed to increasing, with the illumination apparatus with a plurality of light sources, uniformity in a distribution of the strength of the illumination light over the illumination area. Further, the embodiments described hereinafter are directed to reducing a reduction in the accuracy of the authentication with the biometric authentication apparatus.

In the embodiment, the light source and the diffraction grating element form a pair, and more than two pairs are used. In other words, in the embodiment, one light source and one diffraction grating element are paired, and more than two pairs are used.

Here, first, with reference to FIG. 3 through FIG. 6, the light source and the diffraction grating element suited for the embodiment are explained with respect to a configuration of one pair.

Figure 3:
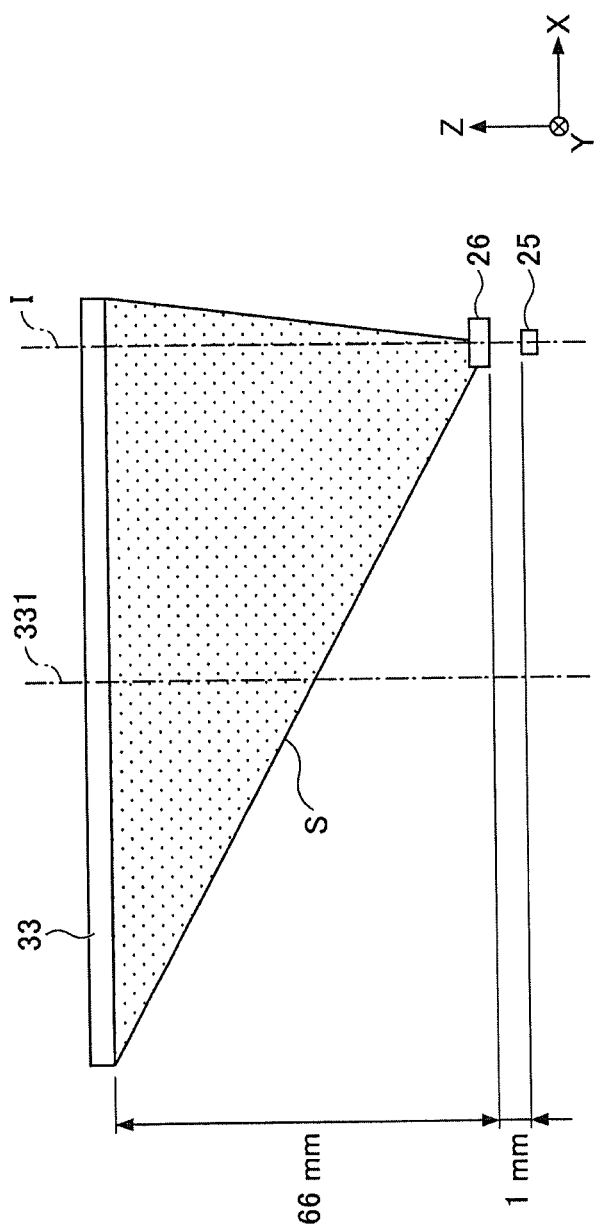
FIG. 3 is a diagram schematically illustrating an example of a cross-section of a pair of a light source and a diffraction grating element.

FIG. 3 is a diagram schematically illustrating an example of a cross-section of a pair of the light source 25 and the diffraction grating element 26. In FIG. 3, X, Y and Z directions, which are perpendicular to each other, are defined. In the following, the term "a positive side" of the X direction is used to represent a positional relationship between two points such that a point on the positive side is located further with respect to another point in a direction along an arrow of the X direction in FIG. 3. Similarly, the term "a negative side" of the X direction is used to represent a positional relationship between two points such that a point on the negative side is located nearer with respect to another point in the direction along the arrow of the X direction in FIG. 3. This also holds true for the Y direction and the Z direction. Further, in FIG. 3, spread light from the diffraction grating element 26 toward the illumination area 33 is schematically illustrated with a hatching region S. It is noted that, in the FIG. 3, an optical axis of the light source 25 and a center of the diffraction grating element 26 are aligned. Further, as an example, the Z direction is parallel with the optical axis I of the light source 25.

In FIG. 3, the illumination area 33 is schematically illustrated in a section-view. The illumination area 33 is provided such that a center 331 of the illumination area 33 is offset with respect to the light source 25 in the X direction, illustrated in FIG. 3. In the following, such a positional relationship between the illumination area 33 and light source 25 (offset arrangement in the X direction) is also referred to as "offset type arrangement". The offset type arrangement is advantageous in that an imaging optical system (described hereinafter) such as a camera, etc., can be disposed such that the imaging optical system faces the illumination area 33.

An outside shape and a size of the illumination area 33 are arbitrary. Typically, the outside shape and the size of the illumination area 33 are determined according to an outside shape and a size of a part of a person's body to be authenticated. For example, in the case of the non-contact type authentication, the illumination area 33 may be an area at which the part of the person's body is assumed to be located at the time of the authentication. On the other hand, in the case of the contact type authentication, the illumination area 33 may be a part (a platen formed of a transparent material such as a glass, for example) that comes into contact with the part of the person's body. It is noted that the size of the illumination area 33 is substantially greater than the size of a diffraction region of the diffraction grating element 26 and the size of a light emitting surface of the light source 25. In the following, as an example, it is assumed that the illumination area 33 is a planer area with a rectangular shape and parallel to the X-Y plane.

The light source 25 emits the light to the illumination area 33. The optical axis of the light source 25 is illustrated by a reference "I". In the example illustrated in FIG. 3, the optical axis I is perpendicular to the illumination area 33 (i.e., parallel with the Z direction). Preferably, the light source 25 is not a light source that emits light with high directivity and parallel light flux characteristics, such as laser light, but a light source that emits spread light. The light source 25 may include a LED (e.g. a near-infrared LED, a white LED), for example.

The diffraction grating element 26 is provided between the illumination area 33 and the light source 25. The diffraction grating element 26 includes an integrated body in which a plurality of diffraction gratings are arranged in a two dimensional array (see FIG. 4). In the example illustrated in FIG. 3, the plane of the two dimensional array is parallel with X-Y plane.

It is noted that in the example illustrated in FIG. 3, as an example, the illumination area 33 has the rectangular shape of 105 mm×105 mm, and a distance between the light source 25 and the diffraction grating element 26 is 1 mm. Further, a distance between the illumination area 33 and the diffraction grating element 26 is 66 mm in the Z direction. Further, in the example illustrated in FIG. 3, the center of the plane of the two dimensional array of the diffraction grating element 26 (also referred to as "a center of the diffraction grating element 26", hereinafter) is disposed on the optical axis of the light source 25.

Figure 4:
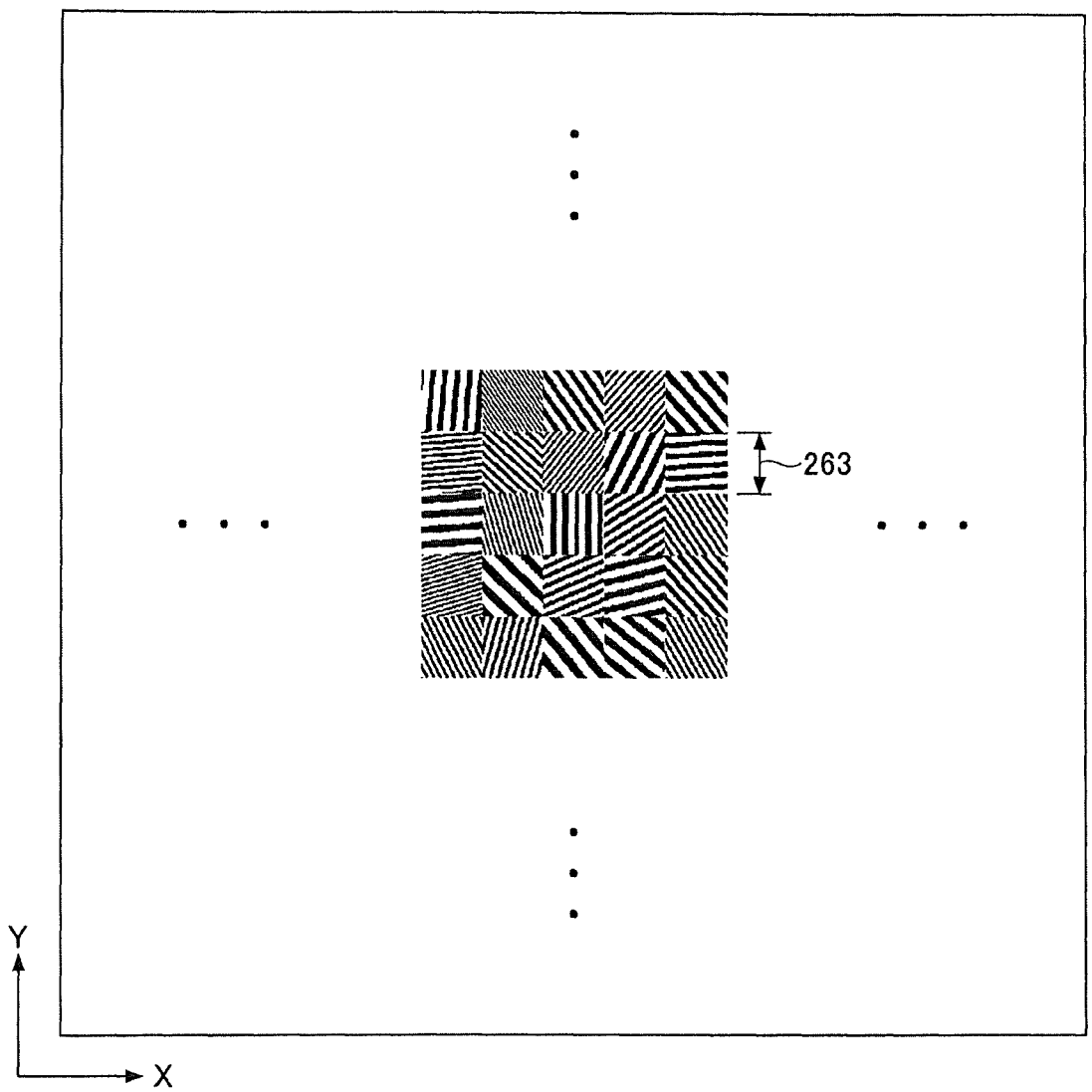
FIG. 4 is a diagram illustrating an example of the diffraction gratings of the diffraction grating element 26.

FIG. 4 is a diagram illustrating an example of the diffraction gratings of the diffraction grating element 26. In the following description, the upper side corresponds to a positive side in the Z direction, and a top view refers to a view as viewed downward from the Z direction (i.e., viewed in a direction toward the negative side in the Z direction). It is noted that, in FIG. 4, the illustration of the diffraction gratings other than those in the center portion of the diffraction grating element 26 is emitted. In this example, the diffraction grating element 26 includes a plurality of the diffraction gratings (also referred to as "cells", hereinafter) 263 arranged in a matrix form. Each cell 263 has a one-dimensional pattern with a plurality of irregularities of a plane grating, a linear grating, etc., such that grooves are arranged in parallel in a straight line. Grating intervals (pitches) and rotation directions of the respective cells 263 may be different. The outside shape of the cells 263 is not limited to the rectangular, the arrangement of the cells 263 is not limited to the matrix form, and the number of the cells 263 is also arbitrary. In the following, a particular cell 263 is identified with the pixel numbers PIX in X and Y directions, and the pixel numbers PIX in X and Y directions are determined using a left and lower cell 263 in FIG. 4 whose pixel numbers PIX in X and Y directions are (1,1). It is noted that, in FIG. 4, each cell 263 is 0.02 mm×0.02 mm in size, for example, the cell 263 is two-dimensionally arranged in 250×250, and the diffraction grating element 26 is 5 mm×5 mm in size, for example. It is noted that a plurality of irregularities in each cell 263 can be arranged along a part of a concentric arc with a great radius. If the radius of the concentric is great, it becomes possible to obtain substantially the same diffraction effect as the straightly arranged pattern.

Figure 5C:
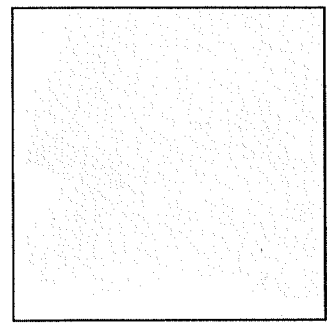
FIGS. 5A through 5C are diagrams illustrating a distribution of an optical strength in the illumination area 33.
Figure 5B:
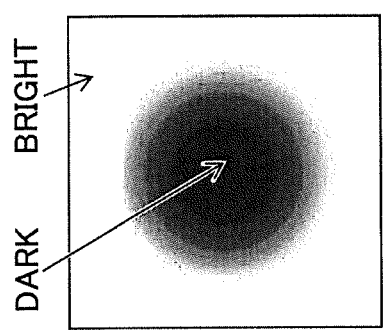
Figure 5A:
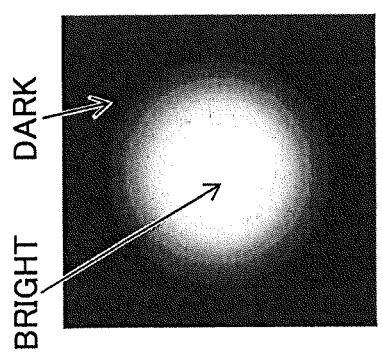

FIGS. 5A through 5C are diagrams illustrating a distribution of an optical strength in the illumination area 33. FIG. 5A illustrates a distribution of an optical strength of 0th-order transmitted light, FIG. 5B illustrates a distribution of an optical strength of n-th order diffracted light, and FIG. 5C illustrates a distribution of an optical strength of a combination of the 0th-order transmitted light and the n-th order diffracted light. In FIG. 5, it is meant that the more black the grayscale becomes, the smaller (i.e., the darker) the optical strength becomes.

As illustrated in FIG. 5A, the 0th-order transmitted light is inevitably generated in the diffraction grating element 26, and thus the distribution of the optical strength of the illumination light over the illumination area 33 is affected by the distribution of the optical strength of the illumination light by the 0th-order transmit light. In particular, the center region of the diffraction grating element 26 has higher optical strength of the light incident from the light source 25 than other regions (Gaussian distribution, for example), and thus has a distribution of optical strength substantially affected by the illumination light by the 0th-order transmit light from the cells 263 in the center region of the diffraction grating element 26. Further, as illustrated in FIG. 5B, the optical strength of the n-th diffracted light that illuminates the center region of the illumination area 33 is smaller than that of the n-th diffracted light that illuminates the edge regions of the illumination area 33. Specifically, the distribution of the optical strength by the n-th diffracted light has its minimum at the center of the illumination area 33 (i.e., the center of the light source 25), when viewed in the Z direction, as illustrated in FIG. 5B. Therefore, according to the first embodiment, as illustrated in FIG. 5C, it becomes possible to increase uniformity in the distribution of the optical strength when the 0th-order transmitted light and the n-th diffracted light are combined.

In this way, the diffraction grating element 26 of the embodiment is formed such that uniform light intensity as illustrated in FIG. 5C can be implemented in the illumination area 33 when the center of the diffraction grating element 26 is on the optical axis of the light source 25.

Figure 6:
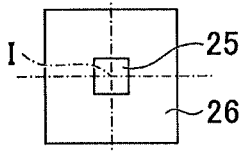
FIG. 6 is a table illustrating the relationship between a mounting position error and an illumination distribution.

FIG. 6 is a table illustrating the relationship between a mounting position error and an illumination distribution. In FIG. 6, in a column of "mounting position error", each image schematically illustrating a positional relationship between the light source 25 and the diffraction grating element 26 in a top view is inserted. Further, in FIG. 6, in a column of "illumination distribution", each image schematically illustrating an illumination distribution (the light intensity distribution) in the illumination area 33 in a top view is inserted. Similarly, with respect to the illumination distribution in the illumination area 33, it is shown that the more black the grayscale becomes, the smaller (i.e., the darker) the optical strength becomes.

Case 1 is a case where the mounting position error is "0" (No), and illustrates a case where the center of the diffraction grating element 26 is positioned on the optical axis I of the light source 25. Case 2 illustrates a case where the optical axis I of the light source 25 is deviated −200 μm in the X direction with respect to the center of the diffraction grating element 26. Case 3 illustrates a case where the optical axis I of the light source 25 is deviated +200 μm in the X direction with respect to the center of the diffraction grating element 26. Case 4 illustrates a case where the optical axis I of the light source 25 is deviated +200 μm in the Y direction with respect to the center of the diffraction grating element 26. Case 5 illustrates a case where the optical axis I of the light source 25 is deviated −200 μm in the Y direction with respect to the center of the diffraction grating element 26.

As illustrated in FIG. 6, the diffraction grating element 26 has such a property that shifting the center of the diffraction grating element 26 with respect to the optical axis I of the light source 25 to one side of the illumination area 33 causes the light intensity of an end portion on a side of the illumination area 33 to become smaller. For example, in the Case 2, the diffraction grating element 26 has its center shifted to the positive side in the X direction with respect to the optical axis I of the light source 25. Then, in the Case 2, the light intensity has such a property that the light intensity becomes smaller at the end portion of the positive side in the X direction in the illumination area 33, as compared with the case of the Case 1. Similarly, for example, in the Case 4, the diffraction grating element 26 has its center shifted to the negative side in the Y direction with respect to the optical axis I of the light source 25. Then, in the Case 4, the light intensity has such a property that the light intensity becomes smaller at the end portion of the negative side in the Y direction in the illumination area 33, as compared with the case of the Case 1.

Further, the diffraction grating element 26 has such a property that shifting the center of the diffraction grating element 26 with respect to the optical axis I of the light source 25 to one side of the illumination area 33 causes the light intensity of an end portion on the opposite side of the illumination area 33 to become greater. For example, in the Case 2, the diffraction grating element 26 has its center shifted to the positive side in the X direction with respect to the optical axis I of the light source 25. Then, in the Case 2, the light intensity has such a property that the light intensity becomes greater at the end portion of the negative side in the X direction in the illumination area 33, as compared with the case of the Case 1. Similarly, for example, in the Case 4, the diffraction grating element 26 has its center shifted to the negative side in the Y direction with respect to the optical axis I of the light source 25. Then, in the Case 4, the light intensity has such a property that the light intensity becomes greater at the end portion of the positive side in the Y direction in the illumination area 33, as compared with the case of the Case 1.

According to illumination apparatus 100 of the embodiment described hereinafter, in implementing a uniform intensity distribution of the illumination light in the illumination area from the lighting device using a plurality of light sources, the mounting position errors of the light source, etc., are permitted to some extent, and problems due to the mounting position errors, such as non-uniformity of light intensity distribution, are reduced. Specifically, with reference to subsequent figures from FIG. 7, the illumination apparatus 100 according to the embodiment is described.

Figure 7:
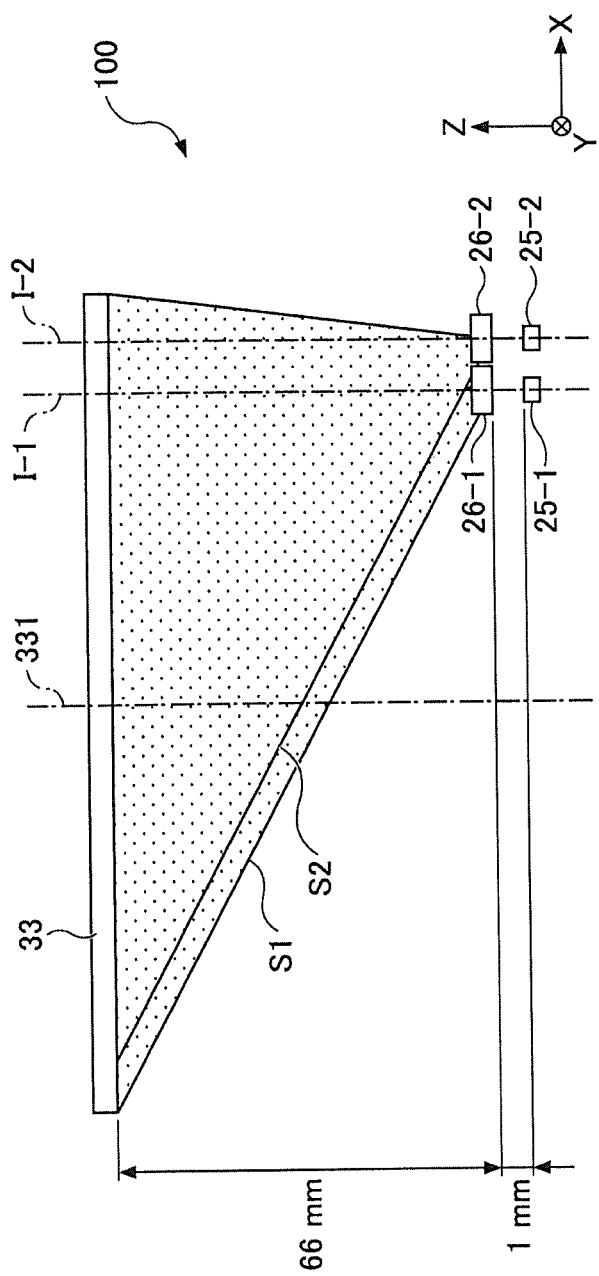
FIG. 7 is a diagram schematically illustrating an example of a cross-section of an illumination apparatus according to the embodiment.
Figure 8:
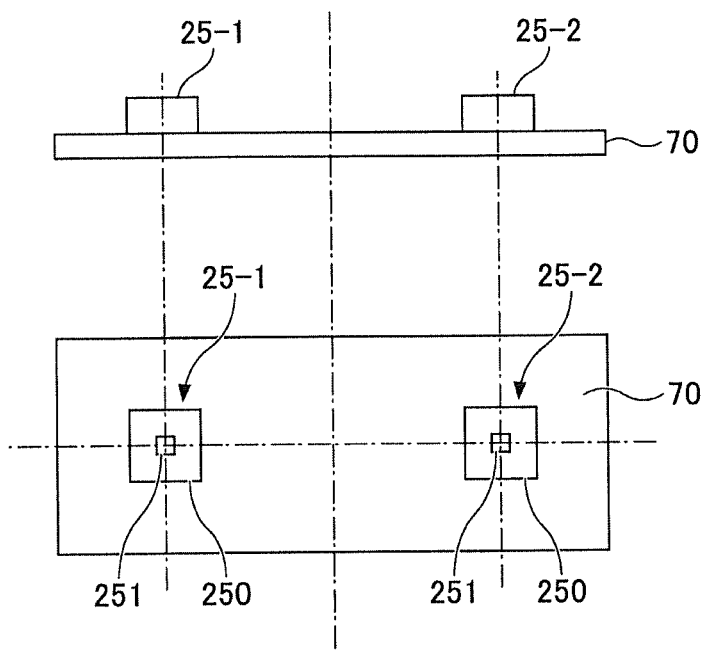
FIG. 8 is a 2-view drawing schematically illustrating a light source substrate.
Figure 9A:
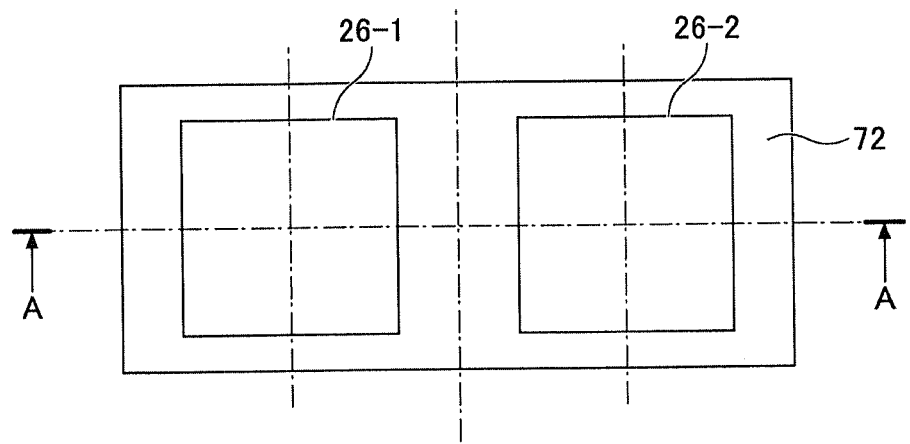
FIG. 9A is a top view schematically illustrating the diffraction grating element substrate 72.
Figure 9B:
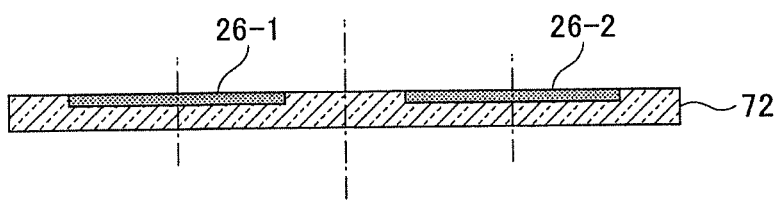
FIG. 9B is a diagram for illustrating a cross-section view along a line A-A in FIG. 9A.
Figure 10A:
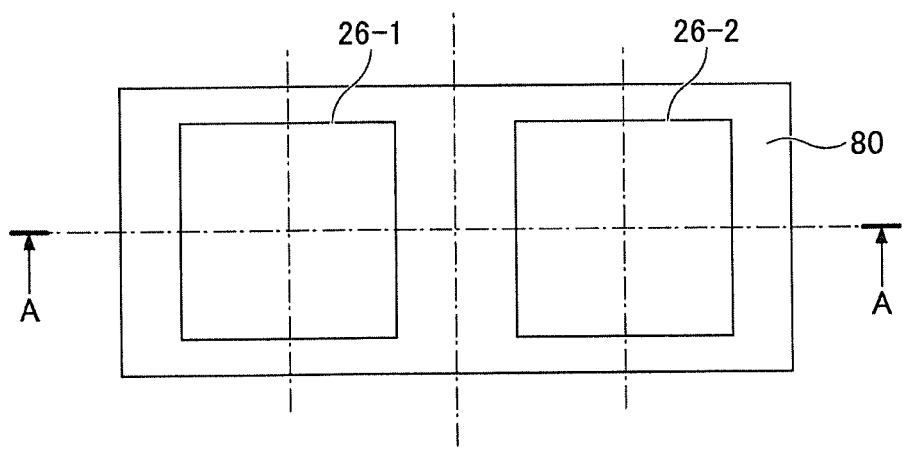
FIG. 10A and FIG. 10B are diagrams explaining another mounting way of a diffraction grating element.
Figure 10B:
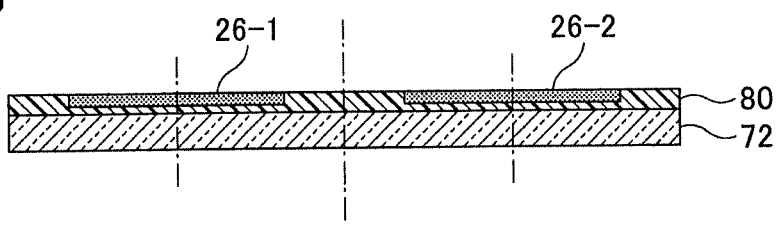

FIG. 7 is a diagram schematically illustrating an example of a cross-section of the illumination apparatus according to the embodiment. In FIG. 7, an example of the illumination apparatus according to the embodiment is indicated by a reference number "100". In FIG. 7, illustrations of a light source substrate 70 and a diffraction grating element substrate 72 are omitted. FIG. 8 is a 2-view drawing schematically illustrating the light source substrate 70 in which the light source 25 is mounted. In FIG. 8, a plan view is illustrated in a top view. FIG. 9A is a top view schematically illustrating the diffraction grating element substrate 72 on which the diffraction grating element 26 is mounted. FIG. 9B is a diagram for illustrating a cross-section view along a line A-A in FIG. 9A. FIG. 10A and FIG. 10B are diagrams explaining another mounting way of the diffraction grating element 26, and include top views and cross-sectional views similar to FIG. 9B and FIG. 9B, respectively.

The illumination apparatus 100 includes two light sources 25 (examples of first and second light sources) and the two diffraction grating elements 26 (examples of a first diffraction grating element and a second diffraction grating element) and the light source substrate 70 (an example of a first substrate) and the diffraction grating element substrate 72 (an example of a second substrate). In the following, for each of the two light sources 25, when distinguishing each, expressions of the light source 25-1 and the light source 25-2 are used. Similarly, for each of the two light sources 25, when distinguishing each, expressions of the diffraction grating element 26-1 and the diffraction grating element 26-2 are used.

The light source 25-1 and the diffraction grating element 26-1 form a first pair, and the light source 25-2 and the diffraction grating element 26-2 forms a second pair. It is noted that, in FIG. 7, spread of light toward the illumination area 33 from the first pair is illustrated in schematically hatched range S1, and spread of light toward the illumination area 33 from the second pair is illustrated in schematically hatched range S2.

The light sources 25-1, 25-2 are provided such that the light sources 25-1, 25-2 are aligned in the X direction. However, the light sources 25-1, 25-2, due to mounting position error or the like, may be disposed slightly offset in the Y direction (see Case 14, 15 in FIG. 12). The light sources 25-1, 25-2 are offset on the same side (the positive side of the X direction in the example of FIG. 7,) with respect to the center 331 of the illumination area 33 in the X direction, as illustrated in FIG. 7. That is, in the example illustrated in FIG. 7, an offset type arrangement is achieved. The offset type arrangement is advantageous in that an imaging optical system (described hereinafter) such as a camera can be disposed to be opposed to the illumination area 33 in the XY plane at substantially the same Z coordinate as the light source 25-1, 25-2.

In the embodiment, as an example, the light sources 25-1, 25-2, as illustrated in FIG. 8, are mounted on the common light source substrate 70. The light sources 25-1, 25-2 are mounted on the light source substrate 70 in the form of light source assemblies (chips) 250. The light source assemblies 250 each include a light emitting portion (die) 251 therein. In FIG. 8, the two light sources 25-1, 25-2 are mounted in position as designed with respect to the light source substrate 70; however, as described later, the mounting positions of the light sources 25-1, 25-2 may shift from the design position (i.e., the nominal position).

The light source substrate 70 is a substrate on which the light source 25-1, 25-2 are mounted. The light source substrate 70 may be a separate substrate for each of the light sources 25-1, 25-2, but is preferably a common substrate to the light sources 25-1, 25-2. If the light source substrate 70 is a common substrate to the light sources 25-1, 25-2, a midpoint alignment described hereinafter becomes easier.

In the embodiment, as an example, the diffraction grating elements 26-1, 26-2, as illustrated in FIG. 9A and FIG. 9B, are mounted on the common diffraction grating element substrate 72. The diffraction grating elements 26-1, 26-2 may be directly formed on the diffraction grating element substrate 72, for example, by a semiconductor process (e.g., etching, etc.). Alternatively, the diffraction grating element 26-1, 26-2, as illustrated in FIGS. 10A and 10B, may be mounted by bonding with resin 80 or the like on the diffraction grating element substrate 72. In this case, as the resin 80, transparent (light-transparent) resin may be used.

The diffraction grating elements 26-1, 26-2 are provided with respect to the light sources 25-1, 25-2, respectively, such that the centers of the diffraction grating elements 26-1, 26-2 are substantially located on the optical axes I-1, I-2, respectively. However, as a result of the midpoint alignment described hereinafter, the centers of the diffraction grating elements 26-1, 26-2 may be slightly displaced with respect to the optical axes I-1, I-2 of the light sources 25-1, 25-2 (see Cases 12 to 15 in FIG. 12), respectively.

The diffraction grating elements 26-1, 26-2 are mounted with the same orientation on the diffraction grating element substrate 72. Here, each of the diffraction grating elements 26-1, 26-2 is an aggregate of a plurality of cells 263, as illustrated in FIG. 4. The diffraction grating elements 26-1, 26-2 include the cells 263 in the same pattern. That is, the diffraction grating elements 26-1, 26-2 are integrated units in which each cell 263 with the same PIX number has the same in a configuration (i.e., a lattice spacing and a rotation direction). The fact that the orientations of the diffraction grating elements 26-1, 26-2 are the same means that the patterns of the diffraction grating elements 26-1, 26-2 are completely overlapped if one of the diffraction grating elements 26-1, 26-2 is moved by translation without rotation within the XY plane. However, in practice, since a slight error in the mounting may occur, the orientations of the diffraction grating elements 26-1, 26-2 may only need to be substantially the same.

The diffraction grating element substrate 72 is a substrate on which the diffraction grating elements 26-1, 26-2 are mounted. The diffraction grating element substrate 72 is formed of, for example, glass (e.g., synthetic quartz) or plastic. The diffraction grating element substrate 72 is a common substrate to the diffraction grating elements 26-1, 26-2. That is, the diffraction grating elements 26-1, 26-2 are formed on a single diffraction grating element substrate 72. If the diffraction grating element substrate 72 is a common substrate to the diffraction grating elements 26-1, 26-2, the midpoint alignment described hereinafter becomes easier.

In the embodiment, the light source substrate 70 and the diffraction grating element substrate 72 are aligned in such a manner that a midpoint related to the light sources 25 in the light source substrate 70 and a midpoint related to the diffraction grating elements 26 in the diffraction grating element substrate 72 overlap in a top view. The midpoint related to the light sources 25 in the light source substrate 70 refers to the midpoint of mounting positions of the light sources 25-1, 25-2 in the light source substrate 70. Similarly, the midpoint related to the diffraction grating elements 26 in the diffraction grating element substrate 72 refers to the midpoint of mounting positions of the diffraction grating elements 26-1, 26-2 in the diffraction grating element substrate 72. Accordingly, even when the mounting positions of the light sources 25-1, 25-2 in the light source substrate 70 are deviated from the design positions, a problem due to the deviation (an uneven distribution of the light intensity in illumination area 33) can be reduced. Hereinafter, the deviation of the mounting positions of the light sources 25-1, 25-2 in the light source substrate 70 with respect to the design positions is referred to as "light source mounting position error". Further, aligning the light source substrate 70 and the diffraction grating element substrate 72 with each other in such a manner that the midpoint related to the light sources 25 in the light source substrate 70 and the midpoint related to the diffraction grating elements 26 in the diffraction grating element substrate 72 are aligned (overlapped) in a top view is referred to as "midpoint alignment".

FIG. 11 is an explanatory view of the midpoint alignment, and schematically illustrates a positional relationship between the light sources 25-1, 25-2 and the diffraction grating elements 26-1, 26-2 in a top view. In FIG. 11, the left side schematically illustrates a state before the midpoint alignment, and the right side schematically illustrates a state after the midpoint alignment. In FIG. 11, illustrations of the light source substrate 70 and the diffraction grating element substrate 72 are omitted.

In FIG. 11, the midpoint related to the light sources 25 in the light source substrate 70 is indicated by reference numeral P1, and the midpoint related to the diffraction grating elements 26 in the diffraction grating element substrate 72 is indicated by reference numeral P2. The midpoint alignment above is preferably accomplished by translating of one of the diffraction grating elements 26-1, 26-2 without rotating the diffraction grating elements 26-1, 26-2 within the XY plane. In other words, preferably, the midpoint alignment described above is realized without changing the orientations of the diffraction grating elements 26-1, 26-2. It is noted that changing the orientations of the diffraction grating elements 26-1, 26-2 causes the orientation of an illumination range of the illumination area 33 to vary. Therefore, by realizing the midpoint alignment without changing the orientations of the diffraction grating elements 26-1, 26-2, it becomes possible to reduce the change in the orientation of the illumination range due to the midpoint alignment. This effect becomes advantageous when the illumination apparatus 100 is installed in a biometric authentication sensor described hereinafter.

It is noted that the movement of the diffraction grating elements 26-1, 26-2 for the midpoint alignment can be realized by the movement of the diffraction grating element substrate 72. That is, for example, the midpoint alignment can be implemented by fine adjustment of a fixed position of the diffraction grating element substrate 72 with respect to a housing (not illustrated) to which the light source substrate 70 is fixed. In the embodiment, as an example, the midpoint alignment is implemented by the movement of the diffraction grating element substrate 72; however, the midpoint alignment may be implemented by the movement of the light source substrate 70.

Figure 12:
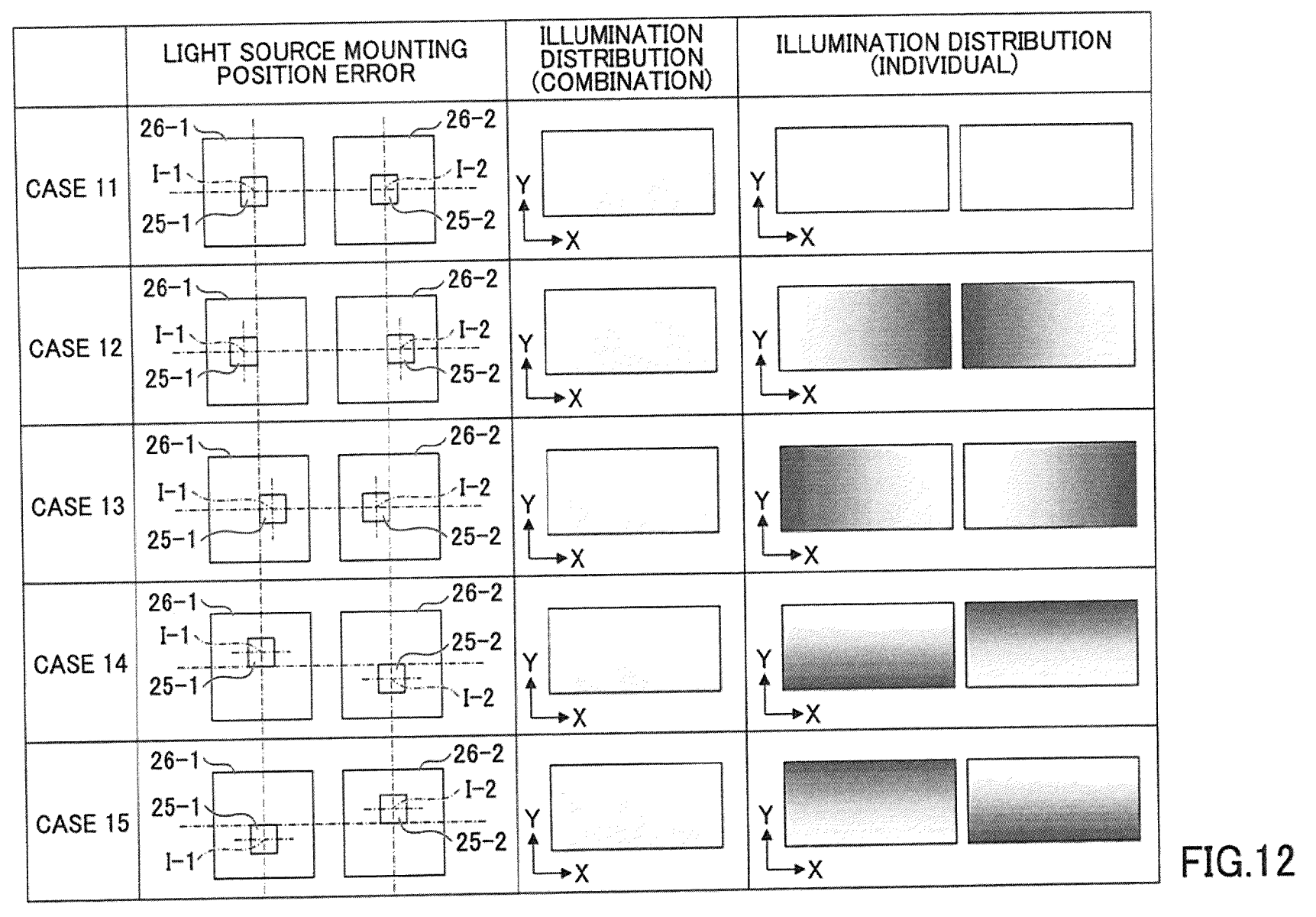

FIG. 12 is a table illustrating the relationship between a light source mounting position error and an illumination distribution. In FIG. 12, in columns of "light source mounting position error", each image schematically illustrating a positional relationship between the light sources 25-1, 25-2 and the diffraction grating elements 26-1, 26-2 in a top view is illustrated. Further, in FIG. 12, in a column of "illumination distribution (combination)", each image schematically illustrating an illumination distribution (an illumination distribution by a combination of two pairs) in the illumination area 33 in a top view is inserted. Further, in FIG. 12, in a column of "illumination distribution (individual)", each image schematically illustrating an illumination distribution (an illumination distribution by each of two pairs) in the illumination area 33 in a top view is inserted, where the left side is related to the first pair (the light source 25-1 and the diffraction grating element 26-1). Similarly, with respect to the illumination distribution in the illumination area 33, the more black the grayscale becomes, the smaller (i.e., the darker) the optical strength becomes.

Case 11 is where the light source mounting position error is "0" (No), and the centers of the diffraction grating elements 26-1, 26-2 are on the optical axes I-1, 1-2 of the light sources 25-1, 25-2, respectively.

Case 12 is where, as the light source mounting position error, a distance in the X direction between the mounting positions of the light sources 25-1, 25-2 is greater than a design value. In FIG. 12, as a result of the midpoint alignment described above, the optical axis I-1 of the light source 25-1 is deviated −200 μm in the X direction with respect to the center of the diffraction grating element 26-1, and the optical axis I-2 of the light source 25-2 is deviated +200 μm in the X direction with respect to the center of the diffraction grating element 26-2.

Case 13 is where, as the light source mounting position error, a distance in the X direction between the mounting positions of the light sources 25-1, 25-2 is smaller than the design value. In FIG. 12, as a result of the midpoint alignment described above, the optical axis I-1 of the light source 25-1 is deviated +200 μm in the X direction with respect to the center of the diffraction grating element 26-1, and the optical axis I-2 of the light source 25-2 is deviated −200 μm in the X direction with respect to the center of the diffraction grating element 26-2.

Case 14 is where, as the light source mounting position error, a distance in the Y direction between the mounting positions of the light sources 25-1, 25-2 is greater than a design value (0, for example), and the light source 25-1 is mounted on the positive side in the Y direction with respect to the light source 25-2. In FIG. 12, as a result of the midpoint alignment described above, the optical axis I-1 of the light source 25-1 is deviated +200 μm in the Y direction with respect to the center of the diffraction grating element 26-1, and the optical axis I-2 of the light source 25-2 is deviated −200 μm in the Y direction with respect to the center of the diffraction grating element 26-2.

Case 15 is where, as the light source mounting position error, a distance in the Y direction between the mounting positions of the light sources 25-1, 25-2 is greater than the design value (0, for example), and the light source 25-1 is mounted on the negative side in the Y direction with respect to the light source 25-2. In FIG. 12, as a result of the midpoint alignment described above, the optical axis I-1 of the light source 25-1 is deviated −200 μm in the Y direction with respect to the center of the diffraction grating element 26-1, and the optical axis I-2 of the light source 25-2 is deviated +200 μm in the Y direction with respect to the center of the diffraction grating element 26-2.

In FIG. 12, in any of the Case 12 to 15, the light source mounting position error occurs. Therefore, the illumination distribution in the illumination area 33 in the case of an individual pair becomes non-uniform, as illustrated in FIG. 12. This is due to the properties described above with reference to FIG. 6. On the other hand, as illustrated in FIG. 12, in any of the Case 12 to 15, the illumination distribution in the illumination area 33, in the case of the combination of each pair, becomes uniform, and there is no significant difference in comparison with the Case 1. This because, by aligning the midpoint related to the light sources 25 with the midpoint related to the diffraction grating elements 26 in a top view, unevenness of each pair in the illumination distribution in the illumination area 33 is corrected (canceled)

For example, in the Case 12, the diffraction grating element 26-1 has its center shifted to the positive side in the X direction with respect to the optical axis I-1 of the light source 25-1. Therefore, in the Case 12, the illumination distribution of the first pair is such that the light intensity becomes smaller at the end portion on the positive side in the X direction in the illumination area 33, and the light intensity becomes greater at the end portion on the negative side (see the Case 2 in FIG. 6). On the other hand, the diffraction grating element 26-2 has its center shifted to the negative side in the X direction with respect to the optical axis I-2 of the light source 25-2. Therefore, in the Case 12, the illumination distribution of the first pair is such that the light intensity becomes smaller at the end portion on the negative side in the X direction in the illumination area 33, and the light intensity becomes greater at the end portion on the positive side (see the Case 3 in FIG. 6). Therefore, in the case 12, the illumination distribution of the first pair and the illumination distribution of the second pair are in an inverse relationship in the X direction, and thus becomes uniform when the illumination distribution of the first pair and the illumination distribution of the second pair are combined (superimposed) so that the unevenness is canceled. This is the same in Case 13 to 15.

In a method of illustrating a target (illumination area 33) with light emitted from the light sources 25 through the diffraction grating elements 26, the increased number of the light sources 25 can increase the light intensity. On the other hand, to make the light intensity distribution in the illumination area 33 uniform, it is effective to accurately align the light sources 25 and the diffraction grating elements 26. However, the mounting accuracy of the light sources 25 onto the light source substrate 70 has a limit, and thus the light sources 25 may not be mounted at the position as designed. In particular, mounting the light sources 25 onto the light source substrate 70 tends to cause the light source mounting position error, because it is difficult to be realized by a semiconductor process unlike the mounting of the diffraction grating elements 26 onto the diffraction optical device substrate 72.

In this respect, according to the comparative example in which the midpoint alignment is not performed, there is a problem that the distribution of the light intensity on the target becomes non-uniform due to the light source mounting position error.

In contrast, according to this embodiment, the midpoint alignment described above is performed. Thus, even if the light source mounting position error has occurred, the problem due to the light source mounting position error (i.e., the uneven distribution of the light intensity in the illumination area 33) can be reduced.

It is noted that, in the example illustrated in FIG. 12, the mounting position error of the diffraction grating elements 26 in the diffraction grating element substrate 72 is regarded as not substantial; however, even if there is such a mounting position error of the diffraction grating elements 26 in the diffraction grating element substrate 72, the mounting position error can be compensated for by the midpoint alignment.

Figure 13:
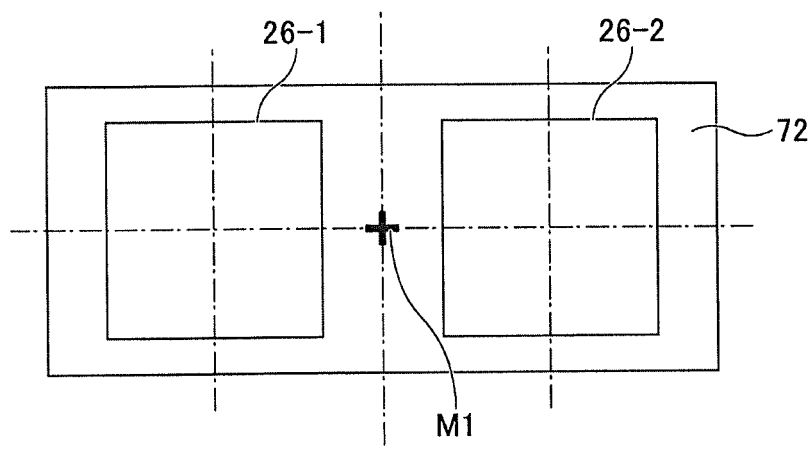
FIG. 13 is a top view schematically illustrating an example of a diffraction grating element substrate with a marker.
Figure 14:
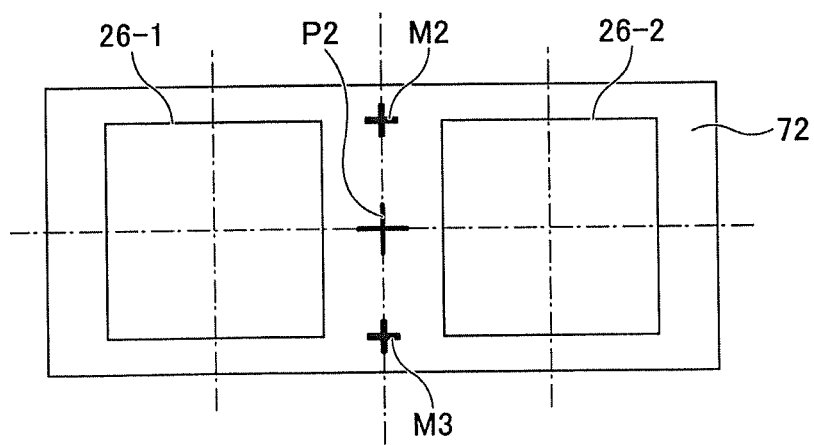
FIG. 14 is a top view schematically illustrating another example of a diffraction grating element substrate with a marker.

Next, with reference to FIGS. 13 to 14, a configuration related to the midpoint related to the diffraction grating elements 26 is described.

FIG. 13 is a top view schematically illustrating an example of the diffraction grating element substrate 72 provided with a marker for the midpoint alignment.

In the example illustrated in FIG. 13, the marker M1 is applied to the position corresponding to the midpoint related to the diffraction grating elements 26. The marker M1 can be formed together during a semiconductor process for forming the diffraction grating elements 26. Therefore, the positional accuracy of such a marker M1 is high, and thus the marker M1 can be effectively used for the midpoint alignment. For the midpoint alignment, the position of the marker M1 is derived on a diffraction grating element substrate 72 basis. The position of the marker M1 can be derived based on the captured image by a camera, for example. In this case, the marker M1 is formed such that the marker M1 is recognized easily based on the image captured by the camera. The shape of the marker M1 is arbitrary. In the example illustrated in FIG. 13, the marker M1 is cross-shaped; however, the marker M1 may be in other forms.

FIG. 14 is a top view schematically illustrating another example of the diffraction grating element substrate 72 provided with a marker for the midpoint alignment.

In the example illustrated in FIG. 14, the markers M2, M3 are applied to the positions whose midpoint corresponds to the midpoint related to the diffraction grating elements 26. That is, the midpoint of the positions of the markers M2, M3 corresponds to the midpoint related to the diffraction grating elements 26. The markers M2, M3 can be formed together during a semiconductor process for forming the diffraction grating elements 26. Therefore, the positional accuracy of such markers M2, M3 is high, and thus the markers M2, M3 can be effectively used for the midpoint alignment. The shape of the markers M2, M3 is arbitrary. In the example illustrated in FIG. 13, the markers M2, M3 are cross-shaped; however, the markers M2, M3 may be in other forms.

As illustrated in FIGS. 13 and 14, when the marker(s) (the marker M1 or the markers M2, M3) is formed on the diffraction grating element substrate 72 in a predetermined position with respect to the midpoint related to the diffraction grating elements 26, the midpoint related to the diffraction grating elements 26 can be recognized with high accuracy using the marker(s). As a result, the accuracy of the midpoint alignment described above can be increased.

It is noted that, in the case of not using the markers (the marker M1 or the markers M2, M3), the midpoint related to the diffraction grating elements 26 can be recognized based on a reference position, which is derived based on an outer shape of the diffraction grating element 26-1, and a reference position, which is derived based on an outer shape of the diffraction grating element 26-2. The reference positions are arbitrary as long as the reference positions are of the same attribute in the diffraction grating element 26-1 and the diffraction grating element 26-2. For example, reference positions are the centers of the diffraction grating element 26-1 and the diffraction grating element 26-2, respectively. Like the marker(s) (the marker M1 or the markers M2, M3), the centers of the diffraction grating element 26-1 and the diffraction grating element 26-2 can be recognized by an image recognition or the like (e.g. an edge detection, a pattern matching, etc.) on a diffraction grating element substrate 72 basis.

Figure 15:
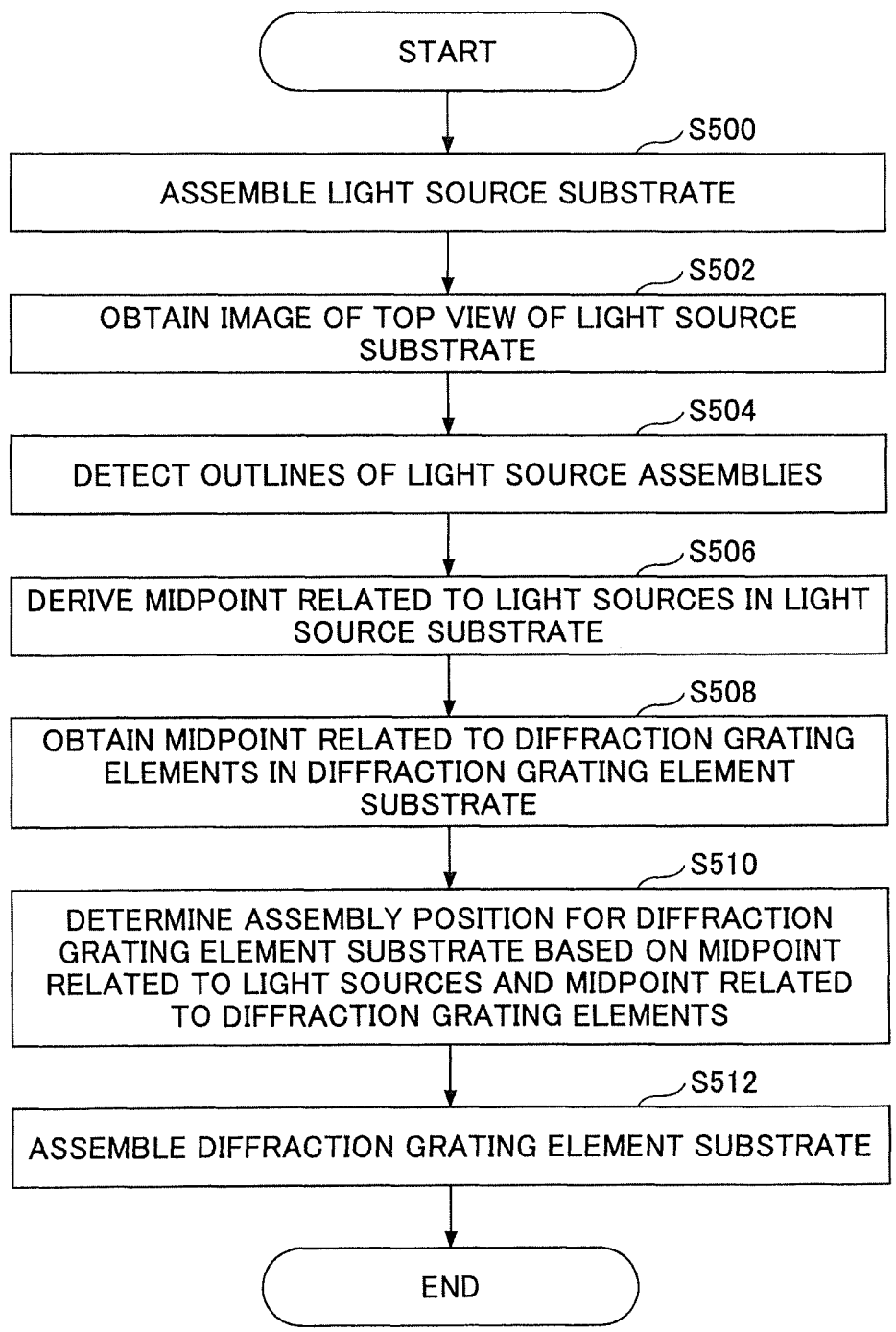
FIG. 15 is a schematic flowchart illustrating an example of a way of manufacturing the illumination apparatus.
Figure 16:
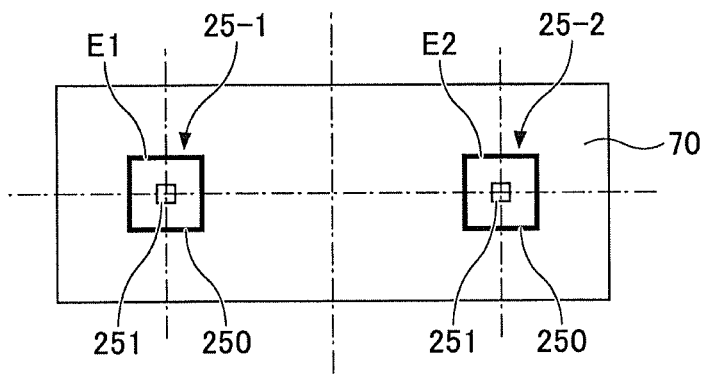
FIG. 16 is a diagram explaining an example of a way of deriving a midpoint related to light sources in a light source substrate.
Figure 17:
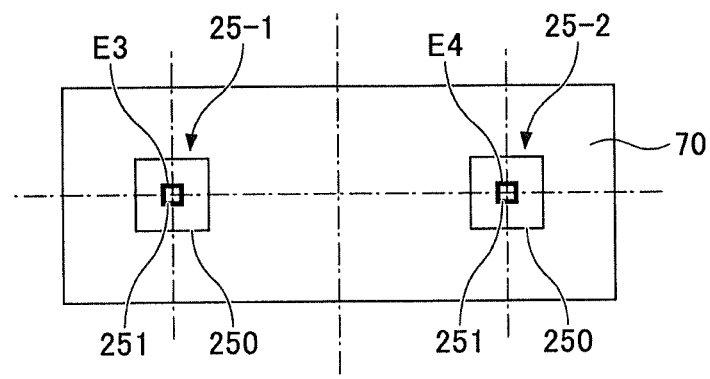
FIG. 17 is a diagram explaining another example of a way of deriving a midpoint related to light sources in a light source substrate.

Next, with reference to FIGS. 15 through 17, more concrete example of the midpoint alignment is explained.

FIG. 15 is a schematic flowchart illustrating an example of a way of manufacturing the illumination apparatus 100. The process of FIG. 15 may be implemented for example by a computer (not illustrated) controlling a manufacturing robot (not illustrated). The process illustrated in FIG. 15 is executed on each of illumination apparatuses 100 to be assembled.

In step S500, the computer causes the robot to assemble the light source substrate 70 in which the light source 25 is mounted to a housing of the illumination apparatus 100.

In step S502, the computer causes the robot to obtain the image of a top view of the light source substrate 70 via a camera (not illustrated).

In step S504, the computer detects outlines of the light source assemblies 250 related to the light sources 25-1, 25-2, on the basis of the image obtained in step S502, by performing image processing (the edge detection, etc.). For example, in FIG. 16, edges E1, E2 detected as the outlines of the light source assemblies 250 related to the light sources 25-1, 25-2 are schematically illustrated.

In step S506, the computer derives, based on the outlines of the light source assemblies 250 obtained in step S504, a coordinate value of the midpoint related to the light sources 25 in the light source substrate 70. Specifically, the computer calculates centroids of the outlines of the light source assemblies 250, and determines the midpoint of the calculated centroids as the coordinate value of the midpoint related to the light sources 25 in the light source substrate 70. It is noted that each coordinate value may be derived in an absolute coordinate system by a conversion from a local coordinate system of the camera.

In step S508, the computer obtains the coordinate values of the midpoint related to the diffraction grating elements 26 in the diffraction grating element substrate 72. The coordinate values of the midpoint related to the diffraction grating elements 26 in the diffraction grating element substrate 72 are derived in advance, and stored, for example, in a storage device (not illustrated) such that the derived coordinate value of each diffraction grating element substrate 72 is associated with identification number. In this case, the computer acquires the coordinate value of the corresponding midpoint from the storage device, based on the identification number related to the diffraction grating element substrate 72 (having the diffraction grating elements 26 mounted thereon) that is to be assembled to the light source substrate 70. It is noted that, similarly, the coordinate value of the midpoint related to the diffraction grating elements 26 may be derived in the absolute coordinate system by a conversion from a local coordinate system of the camera.

In step S510, the computer determines, based on the coordinate value of the midpoint related to the light sources 25 obtained in step S506 and the coordinate value of the midpoint related to the diffraction grating element 26 obtained in step S508, an assembly position for the diffraction grating element substrate 72. That is, the computer determines the assembly position for the diffraction grating element substrate 72 with respect to the housing of the illumination apparatus 100 (the position in the XY plane) so that the midpoint alignment described above is implemented.

In step S512, the computer causes the robot to assemble the diffraction grating element substrate 72 to the assembly position obtained in step S510. In this case, the computer gives the robot a teaching point for realizing the assembly to the assembly position.

According to the process illustrated in FIG. 15, the midpoint alignment can be achieved for each pair, which is formed by the light source substrate 70 and the diffraction grating element substrate 72 to be assembled, using the robot. Therefore, even when the light source mounting position error in the light source substrate 70 occurs, non-uniformity of the illumination distribution of the illumination apparatus 100 due to the mounting position error (non-uniform distribution of light intensity in the illumination area 33) can be reduced.

It is noted that, in the process illustrated in FIG. 15, the light source substrate 70 and the diffraction grating element substrate 72 are assembled, respectively, to the housing; however, the light source substrate 70 and the diffraction grating element substrate 72 may be sub-assembled and then may assembled to the housing. In this case, the diffraction grating element substrate 72 is assembled to the light source substrate 70. In this case also, the same midpoint alignment can be implemented.

Further, in the processes illustrated in FIG. 15, in step S504 and step S506, the coordinate value of the midpoint related to the light sources 25 is calculated based on the centroid of the outline of each light source assemblies 250; however, this is not indispensable. For example, in step S504, the computer may detect positions of light emitting portions (dies) 251 related to the light sources 25-1, 25-2, on the basis of the image obtained in step S502, by performing image processing (the edge detection, etc.). For example, in FIG. 16, feature points E3, E4 detected as the light emitting portions 251 related to the light sources 25-1, 25-2 are schematically illustrated. The light emitting portions 251 may be derived as the center positions of the feature points E3, E4. In step S506, the computer determines the coordinate value of the midpoint of light emitting portions 251 obtained in step S504 as a coordinate value of the midpoint related to the light sources 25 in the light source substrate 70. According to this modification, since the mounting tolerance of the light emitting portions 251 can also be absorbed, the midpoint alignment can be implemented with further increased accuracy.

Next, with reference to FIG. 18 through FIG. 24, examples of the biometric authentication sensor in which the illumination apparatus 100 is installed are described.

Figure 18:
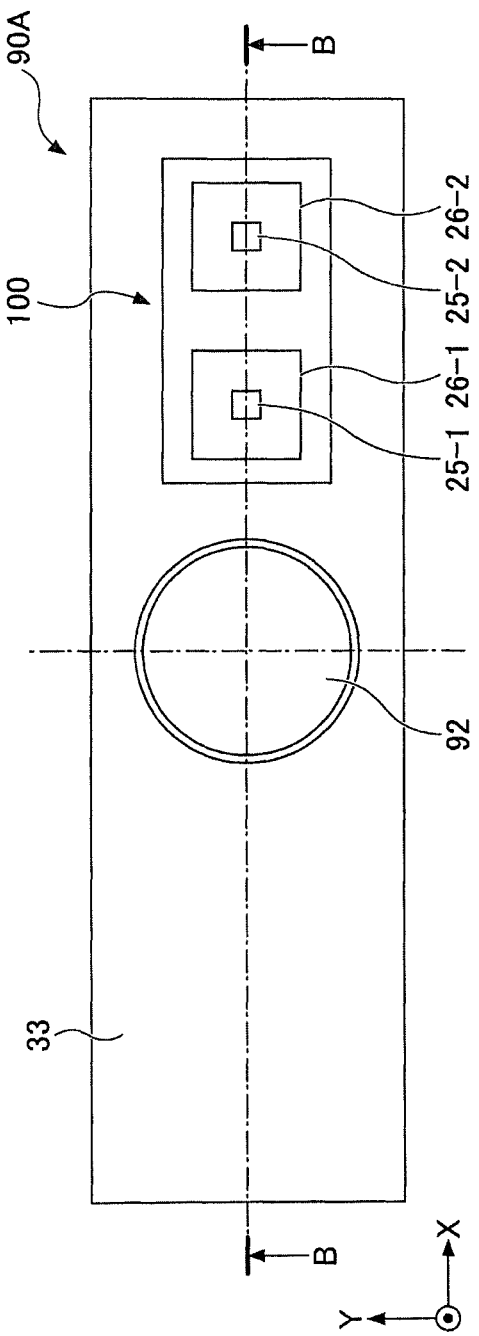
FIG. 18 is a top view schematically illustrating an example of a biometric authentication sensor.
Figure 19:
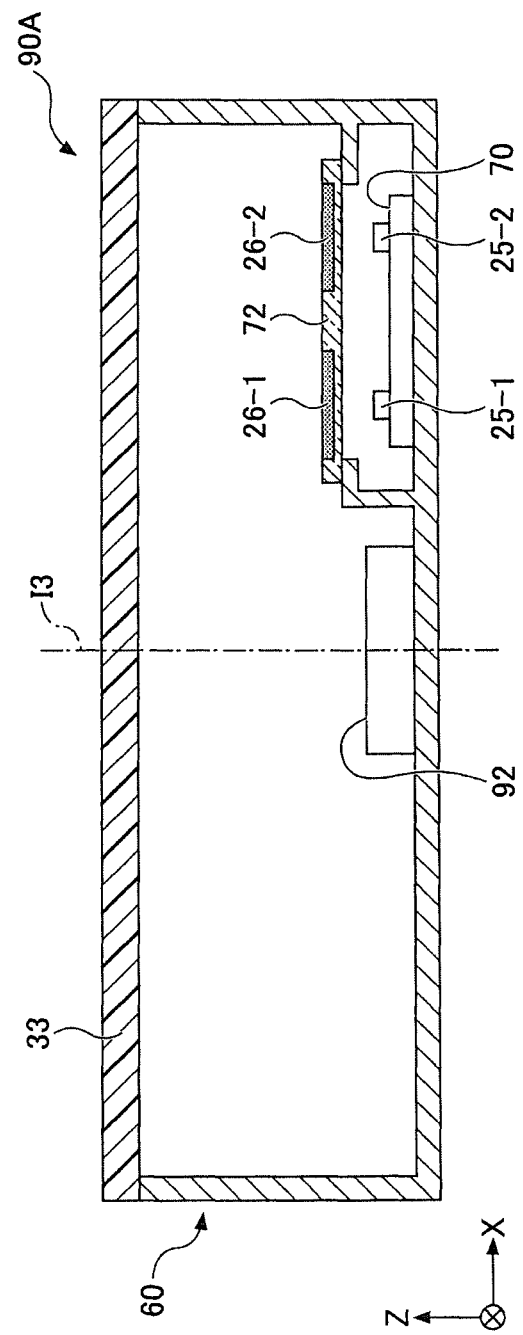
FIG. 19 is a diagram illustrating a cross-sectional view along a line B-B in FIG. 18.

FIG. 18 is a top view schematically illustrating an example of the biometric authentication sensor installed in the illumination apparatus 100. In FIG. 18, an example of the biometric authentication sensor in which the illumination apparatus 100 is installed is indicated by a reference numeral "90A". In FIG. 18, the light sources 25 are illustrated in a transparent view. FIG. 19 is a diagram illustrating a cross-sectional view along a line B-B in FIG. 18.

The second switch part 90A includes an imaging optical system 92 such as a camera, two light sources 25-1, 25-2, and two diffraction grating elements 26-1, 26-2. Two light sources 25-1, 25-2 are mounted on the light source substrate 70 as described above. Further, two diffraction grating elements 26 are mounted on the diffraction grating element substrate 72 as described above. In the example illustrated in FIGS. 18 and 19, the light source substrate 70 and the diffraction grating element substrate 72 are supported and fixed to a housing 60 of the biometric authentication sensor 90A.

The diffraction grating elements 26-1, 26-2 for the light sources 25-1, 25-2 are provided on an exit surface side of the light sources 25-1, 25-2. The light sources 25-1, 25-2 and the diffraction grating elements 26-1, 26-2 are arranged offset to the same side with respect to the center of the illumination area 33. It is noted that both sets of the diffraction grating elements 26-1, 26-2 and the light source 25-1, 25-2 form a lighting apparatus 100 described above.

The imaging optical system 92 is provided to face the illumination area 33. The optical axis 13 of the imaging optical system 92 is parallel to the Z axis, for example. The imaging optical system 92 is provided such that the optical axis 13 comes on the center of the illumination area 33, as illustrated in FIG. 19; however, the imaging optical system 92 may be provided such that optical axis 13 is slightly offset relative to the center of the illumination area 33. Further, the imaging optical system 92 is arranged on a straight line connecting the light sources 25-1, 25-2, as illustrated in FIG. 18. For example, the imaging optical system 92 is arranged such that the optical axis 13 intersects the straight line connecting the light sources 25-1, 25-2, as illustrated in FIG. 18. In the example illustrated in FIGS. 18 and 19, the illumination area 33 is formed of a transparent material such as glass, and is fixed to the housing 60.

The imaging optical system 92 acquires user's biometric information as placed on the illumination area 33 by imaging the illumination area 33. The biometric information may be a vein pattern, a fingerprint or a palm print, etc., of hands or fingers of the user, for example. The imaging optical system 92 captures the image of the illumination area 33 (and thus the hand of the user or the like on the illumination area 33) in a state in which the illumination area 33 is illuminated by the illumination apparatus 100 as described above. In the state in which the illumination area 33 is illuminated by the illumination apparatus 100, because the illumination distribution in the illumination area 33 is made uniform as described above, the biological information can be obtained with high accuracy based on the captured image by the imaging optical system 92.

FIG. 20 through FIG. 24 are diagrams schematically illustrating other examples of a biometric authentication sensor in a top view. In FIG. 20 through FIG. 24, like in FIG. 18, examples of a biometric authentication sensor incorporating the illumination apparatus 100 are indicated by reference numerals "90B through 90F". Further, in FIG. 20 through FIG. 24, like in FIG. 18, the light sources 25 are illustrated in a transparent view.

Figure 20:
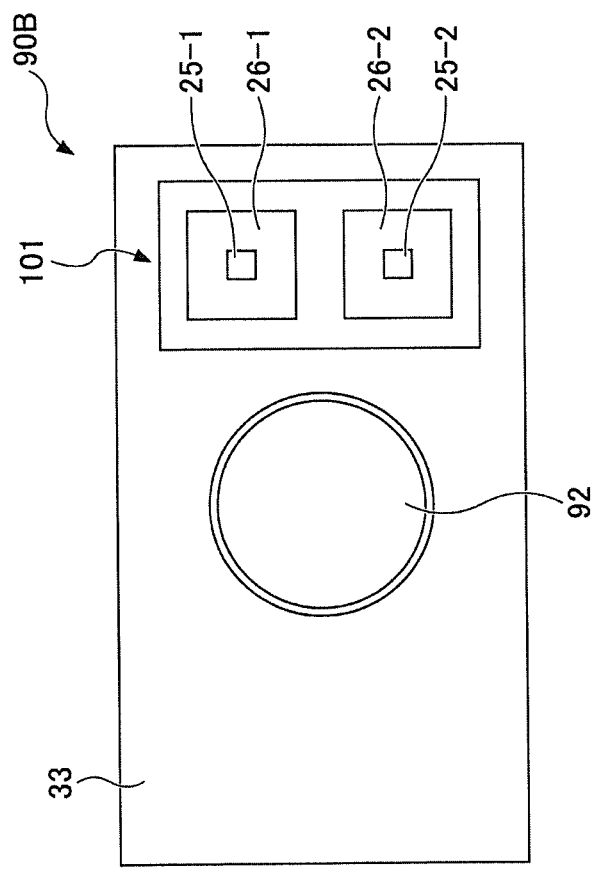
FIG. 20 through FIG. 24 are diagrams schematically illustrating examples of a biometric authentication sensor in a top view.

The biometric authentication sensor 90B illustrated in FIG. 20 differs from the example illustrated in FIG. 18 in that the illumination apparatus 100 is replaced with an illumination device 101.

The illumination apparatus 101 differs from the illumination apparatus 100 described above in the mounting direction with respect to the illumination area 33. That is, the lighting device 101 is provided for the illumination area 33 in such an orientation that the light source 25-1, 25-2 are arranged in the Y direction. It is noted that, also in the illumination device 101, as is the case with the lighting apparatus 100 described above, the midpoint related to the light sources 25 in the light source substrate 70 and the midpoint related to the diffraction grating element 26 in the diffraction grating element substrate 72 are aligned to overlap in a top view. Further, as is the case in the lighting apparatus 100 described above, the light sources 25-1, 25-2 are arranged offset to the same side with respect to the center of the illumination area 33. In the example illustrated in FIG. 20, as is the case in the lighting apparatus 100 described above, the light source 25-1, 25-2 are offset to the positive side of the X direction with respect to the center of the illumination area 33.

Also according to the example illustrated in FIG. 20, since the lighting apparatus 101 differs from the illumination apparatus 100 described above only in the orientation, the illumination distribution in the illumination area 33 can be made uniform as described above. Thus, the biometric information can be obtained with high accuracy based cn the captured image by the imaging optical system 92.

Figure 21:
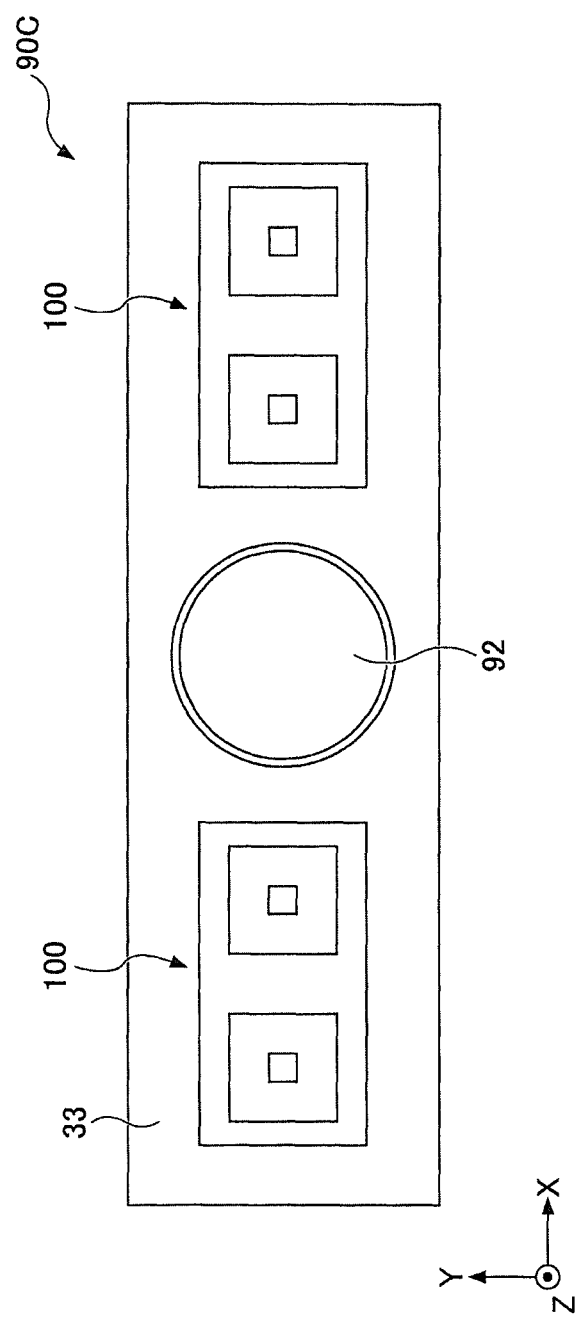

A biometric authentication sensor 90C illustrated in FIG. 21 differs from the example illustrated in FIG. 18 in that two illumination apparatuses 100 are provided for one imaging optical system 92 (i.e. one illumination area 33). Specifically, the illumination apparatus 100 is provided on each of both sides of the imaging optical system 92 in the X direction, as illustrated in FIG. 21.

Also according to the example illustrated in FIG. 21, since the biometric authentication sensor 90C includes the illumination apparatuses 100, the illumination distribution in the illumination area 33 can be made uniform as described above. In addition, by using two illumination apparatuses 100, it is possible to increase the intensity of light in the illumination area 33. Thus, the biometric information can be obtained with increased high accuracy based on the captured image by the imaging optical system 92.

Figure 22:
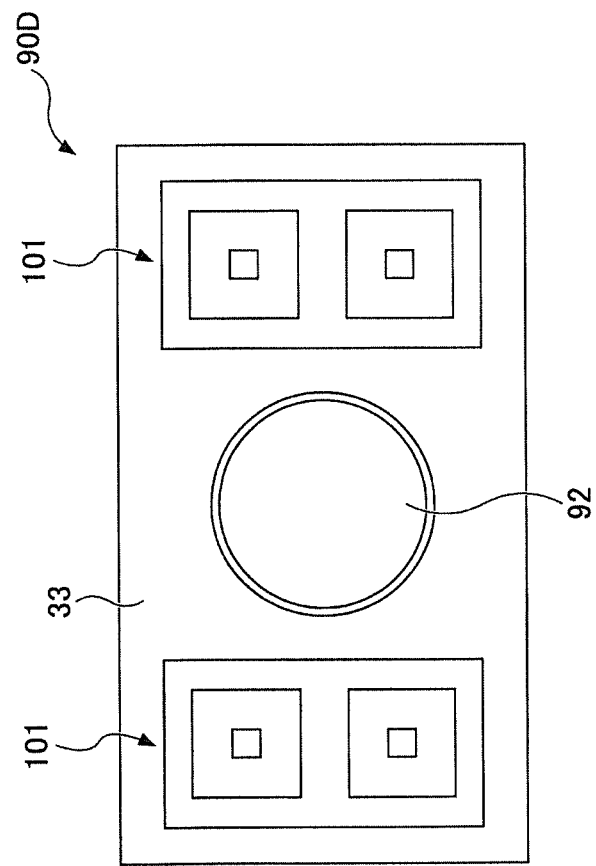

A biometric authentication sensor 90D illustrated in FIG. 22 differs from the biometric authentication sensor 90C illustrated in FIG. 20 in that two illumination apparatuses 101 are provided for one imaging optical system 92 (i.e. one illumination area 33). Specifically, the illumination apparatus 101 is provided on each of both sides of the imaging optical system 92 in the X direction, as illustrated in FIG. 22.

Also according to the example illustrated in FIG. 22, since the biometric authentication sensor 90D includes the illumination apparatuses 101, the illumination distribution in the illumination area 33 can be made uniform as described above. In addition, by using two illumination apparatuses 101, it is possible to increase the intensity of light in the illumination area 33. Thus, the biometric information can be obtained with increased high accuracy based on the captured image by the imaging optical system 92.

Figure 23:
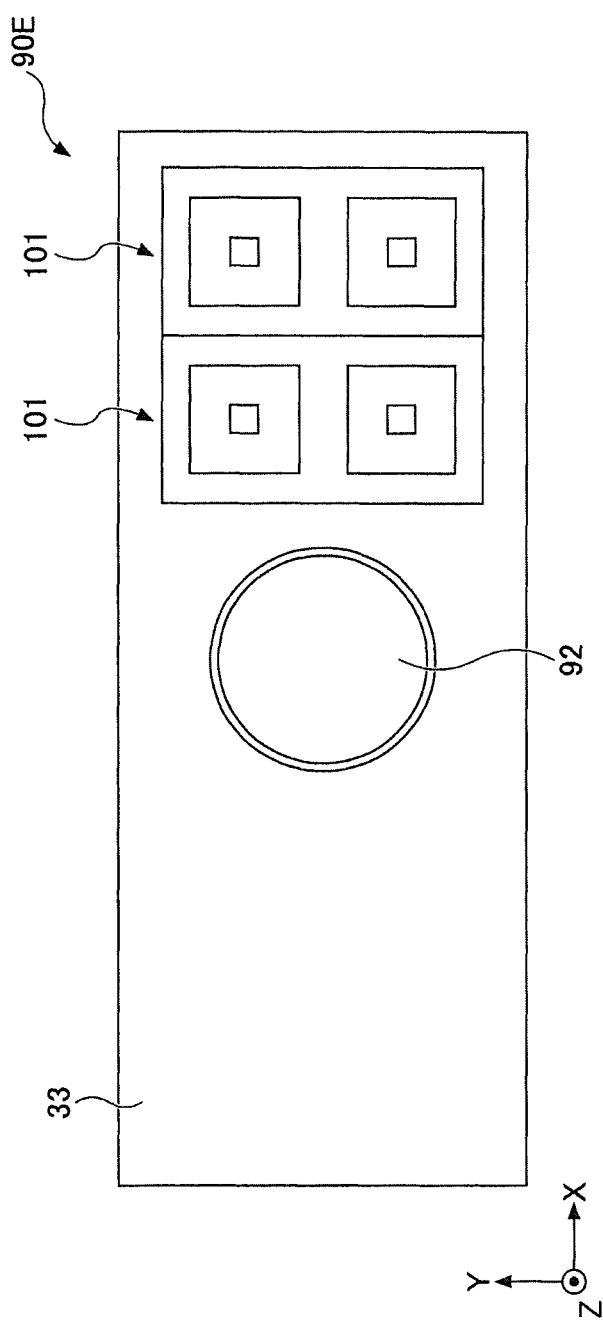

A biometric authentication sensor 90E illustrated in FIG. 23 differs from the biometric authentication sensor 90C illustrated in FIG. 20 in that two illumination apparatuses 101 are provided for one imaging optical system 92 (i.e. one illumination area 33). Specifically, the illumination apparatuses 101 are provided on one side of the imaging optical system 92 in the X direction, as illustrated in FIG. 23.

Also according to the example illustrated in FIG. 23, since the biometric authentication sensor 90E includes the illumination apparatuses 101, the illumination distribution in the illumination area 33 can be made uniform as described above. In addition, by using two illumination apparatuses 101, it is possible to increase the intensity of light in the illumination area 33. Thus, the biometric information can be obtained with increased high accuracy based on the captured image by the imaging optical system 92.

It is noted that, in the example illustrated in FIG. 23, two illumination apparatuses 101 are provided on one side of the imaging optical system 92 in the X direction; however, this is not indispensable. For example, two illumination apparatuses 101 may be provided on one side of the imaging optical system 92 in the X direction such that two illumination apparatuses 100 are arranged side by side in the Y direction.

Figure 24:
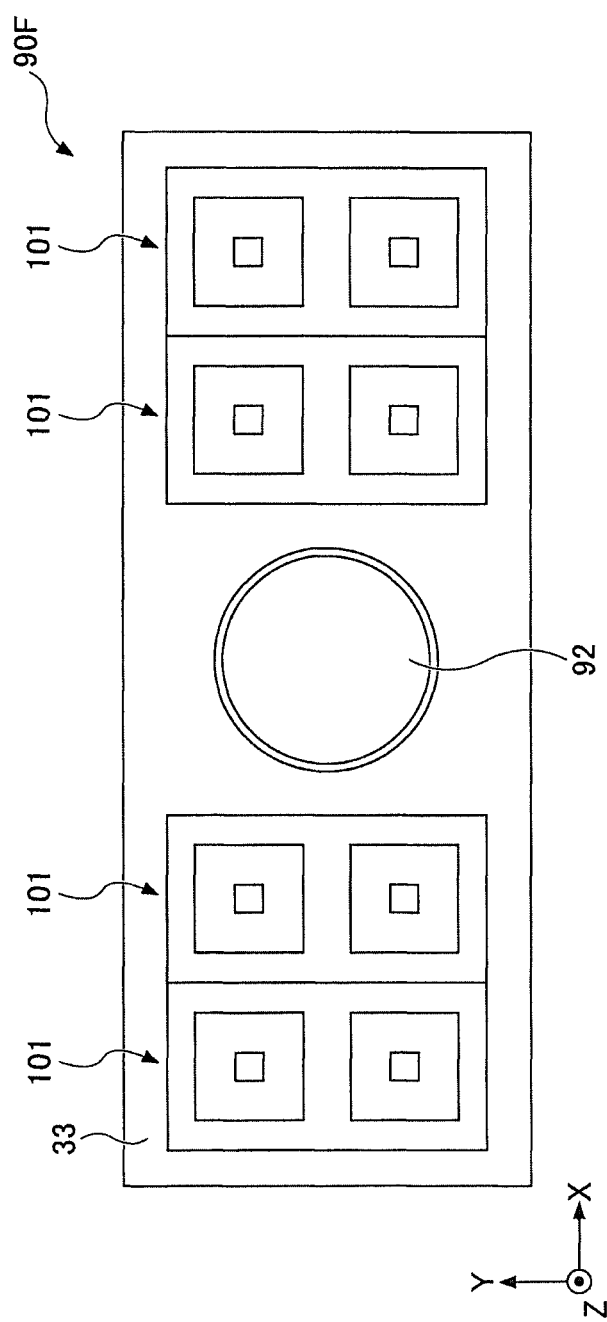

A biometric authentication sensor 90F illustrated in FIG. 24 differs from the biometric authentication sensor 90E illustrated in FIG. 23 in that four illumination apparatuses 101 are provided for one imaging optical system 92 (i.e. one illumination area 33). Specifically, the illumination apparatuses 101 are provided on each side of the imaging optical system 92 in the X direction, as illustrated in FIG. 24.

Also according to the example illustrated in FIG. 24, since the biometric authentication sensor 90F includes the illumination apparatuses 101, the illumination distribution in the illumination area 33 can be made uniform as described above. In addition, by using four illumination apparatuses 101, it is possible to increase the intensity of light in the illumination area 33. Thus, the biometric information can be obtained with increased high accuracy based on the captured image by the imaging optical system 92.

It is noted that, in the example illustrated in FIG. 24, two illumination apparatuses 101 are respectively provided on opposite sides of the imaging optical system 92 in the X direction; however, this is not indispensable. For example, two illumination apparatuses 101 may be respectively provided on opposite sides of the imaging optical system 92 in the X direction such that two illumination apparatuses 100 on each side of the imaging optical system 92 in the X direction are arranged side by side in the Y direction.

Figure 25:
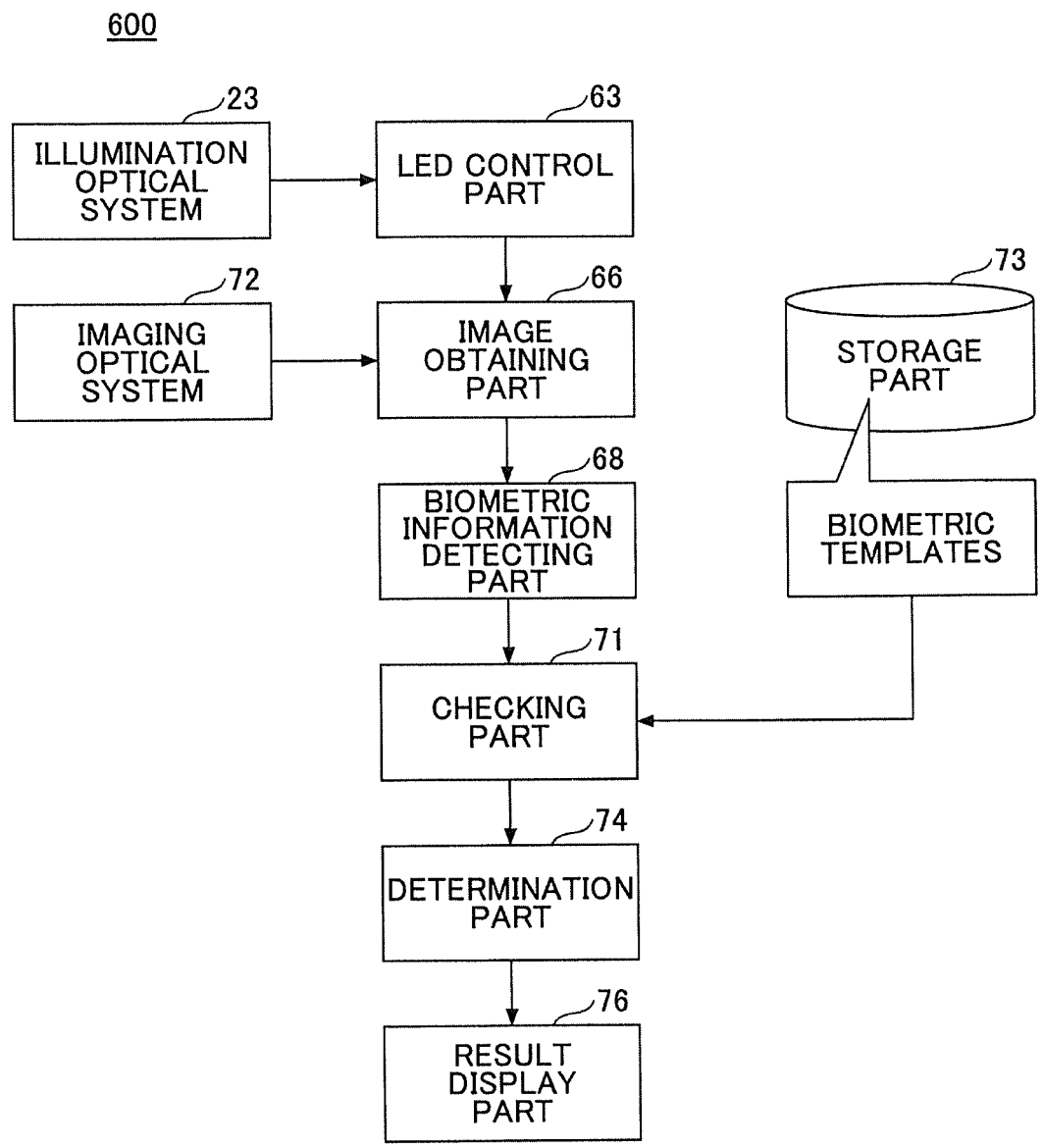
FIG. 25 is a block diagram illustrating an example of the biometric authentication apparatus.
Figure 26:
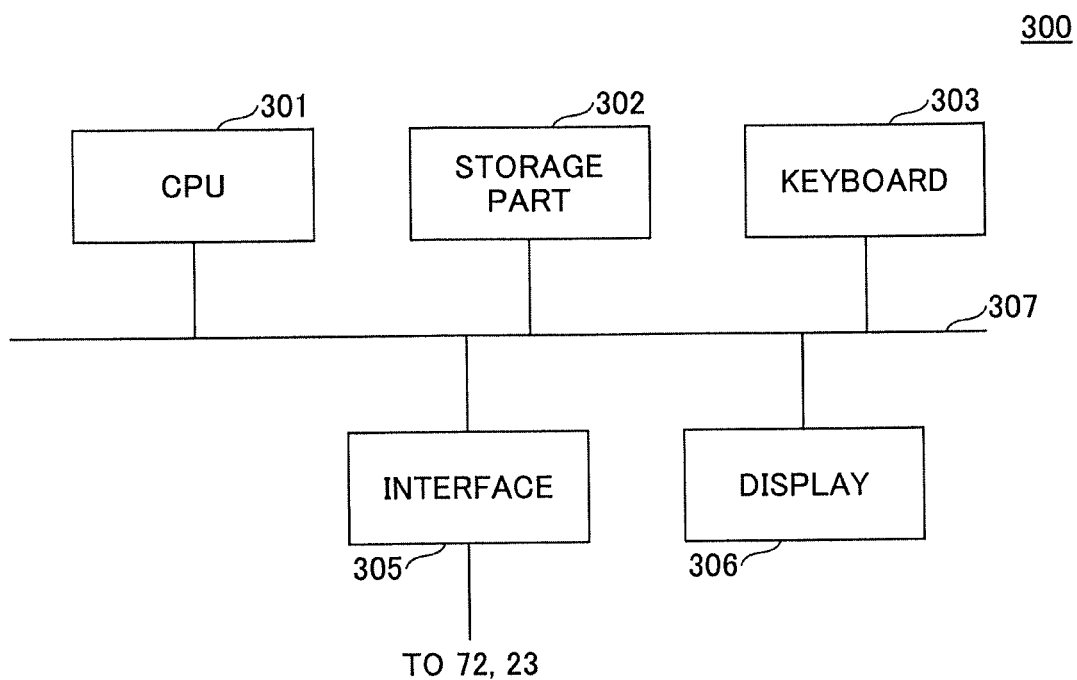
FIG. 26 is a block diagram illustrating an example of a configuration of a computer.

Next, with reference to FIG. 25 and FIG. 26, a biometric authentication apparatus according to an embodiment is described.

FIG. 25 is a block diagram illustrating an example of the biometric authentication apparatus. The biometric authentication apparatus 600 illustrated in FIG. 25 includes an illumination optical system 23, an imaging optical system 92, a LED control part 63, an image obtaining part 66, a biometric information detecting part 68, a checking part 71, a storing part 73, a determination part 74, and a result display part 76. Biometric templates which are prepared in advance are stored in storing part 73. The checking part 71 checks biometric information detected by the biometric information detecting part 68 against the biometric templates. The result display part 76 displays the check result of the checking part 71 or the biometric image.

The illumination optical system 23 includes the illumination apparatus 100 or 101. Further, the illumination optical system 23 and the imaging optical system 92 may include any one of the biometric authentication sensors 90A through 90F described above.

When a user places a palm of his/her hand, which is an example of a person's body part, on the illumination area 33, the biometric authentication apparatus 600 detects the object to be authenticated, which causes the LED control part 63 to turn on the light source 25 of the illumination optical system 23. As a result of this, the light source 25 emits the light to the illumination area 33 via the diffraction grating element 26. The imaging optical system 92 captures the person's body (the palm of the hand, in this example) on the illumination area 33, and the image obtaining part 66 obtains the captured input image. The biometric information detecting part 68 detects the biometric information unique to the user based on the input image. The checking part 71 checks the detected biometric information against the biometric templates stored in the storing part 73. The determination part 74 determines, based on the check result, whether the user is an authorized user. The result display part 76 displays the check result of the checking part 71 or the determination result of the determination part 74 on a display. For example, the result display part 76 displays a message of the check result as to whether the detected biometric information matches the biometric template, etc., on the display. The result display part 76 is an example of an output part that outputs the check result of the checking part 71. The output part that outputs the check result is not limited to the result display part 76 that displays the check result. For example, the output part may include a voice synthesizer that outputs the check result with a voice, for example. Further, the determination part 74 may be omitted, and the function of the determination part 74 may be implemented by the checking part 71.

FIG. 26 is a block diagram illustrating an example of a configuration of a computer. The biometric authentication apparatus 600 illustrated in FIG. 25 may be implemented by the computer 300 illustrated in FIG. 26. The computer 300 illustrated in FIG. 26 may be a general purpose computer such as a personal computer, for example. The computer 300 may have a CPU 301, a storage part 302, a keyboard 303 which is an example of an input part, an interface 305, and a display 306 which is an example of an output part. In this example, the CPU 301, the storage part 302, the keyboard 303, the interface 305, and the display 306 are connected to each other via a bus 307; however, a configuration of the computer 300 is not limited to the configuration in which they are connected via the bus 307. The imaging optical system 92 and the illumination optical system 23 are connected to the interface 305, for example.

The storage part 302 stores programs to be executed by the CPU 301 and items of data including the biometric templates, etc. The storage part 302 may include a HDD (Hard Disk Drive), etc. The CPU 301 executes the programs stored in the storage part 302 to control the computer 300 as a whole. All of or a part of the functions of the LED control part 63, the image obtaining part 66, the biometric information detecting part 68, the checking part 71, the storing part 73, the determination part 74, and the result display part 76, illustrated in FIG. 25, can be implemented by the CPU 301, when the CPU 301 executes the programs. For example, the CPU 301 can implement the function of the checking part 71 by executing the program. The storage part 302 also implements the function of the storing part 73.

The keyboard 303 is used to input commands and data to the CPU 301. The interface 305 is used to connect the computer 300 to an external device. The display 306 displays, under the control of the CPU 301, items of data for the user of the computer 300 (or an operator). The items of data the display 306 displays may include the input image, the message of the check result, etc.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

For example, in the embodiment described above, the light source substrate 70 and the diffraction grating element substrate 72 are aligned in such a manner that the midpoint of the light sources 25 in the light source substrate 70 and the middle point of the diffraction grating elements 26 in the diffraction grating element substrate 72 are aligned (overlapped) in a top view; however, this is not indispensable. The light source substrate 70 and the diffraction grating element substrate 72 may be aligned such that such two midpoints are in a predetermined relationship. For example, the light source substrate 70 and the diffraction grating element substrate 72 may be aligned such that two midpoints are in a positional relationship H1, a positional relationship H2, or a positional relationship H3 in a top view as described hereinafter.

(Positional relationship H1) In top view, the midpoint related to the light sources 25 in the light source substrate 70 is offset in the X direction by a predetermined distance D1 with respect to the midpoint related to the diffraction grating elements 26 in the diffraction grating element substrate 72.

(Positional relationship H2) In top view, the midpoint related to the light sources 25 in the light source substrate 70 is offset in the Y direction by a predetermined distance D2 with respect to the midpoint related to the diffraction grating elements 26 in the diffraction grating element substrate 72.

(Positional relationship H3) In top view, the midpoint related to the light sources 25 in the light source substrate 70 is offset in the X direction by the predetermined distance D1 and in the Y direction by a predetermined distance D2 with respect to the midpoint related to the diffraction grating elements 26 in the diffraction grating element substrate 72.

In these cases, the predetermined distances D1, D2 are values adapted to implement the uniform illumination distribution as illustrated in FIG. 12 (illumination distribution due to the combination of 2 pairs).

Further, in the embodiment described above, the illumination apparatus 100 or 101 includes the same two diffraction grating elements 26-1, 26-2; however, this is not indispensable. For example, the diffraction grating elements 26-1 and 26-2 may include the cells 263 in substantially the same pattern. That is, the arrangement pattern of each cell 263 in the diffraction grating element 26-1 may have some slight differences with respect to the arrangement pattern of each cell 263 in the diffraction grating element 26-2. Similarly, the diffraction grating elements 26-1, 26-2 may partially include one or more different cells 263. That is, a part of the cells 263 in the diffraction grating element 26-1 may have some slight differences with respect to a part of the cells 263 in the diffraction grating element 26-2. In this way, the diffraction grating elements 26-1, 26-2 are not necessarily identical and may have a slight difference as long as the diffraction grating elements 26-1, 26-2, together with the light sources 25-1, 25-2, have the property as illustrated in FIG. 5 and the relationship as illustrated in FIG. 6.

Figure 27:
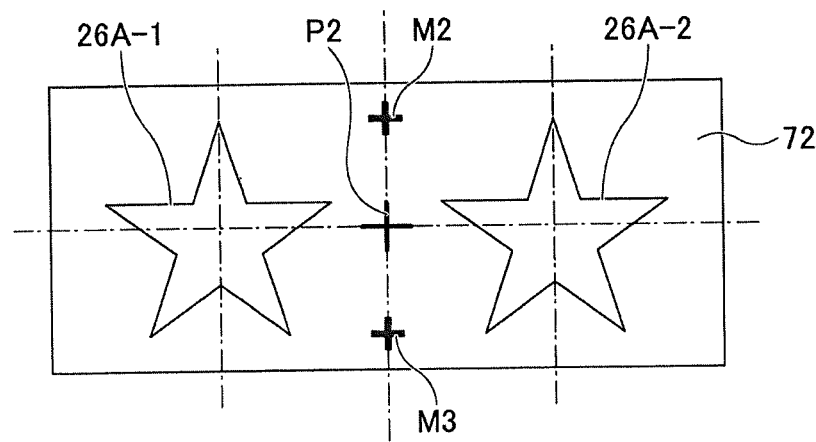
FIG. 27 is a diagram illustrating a variant of an outline of a diffraction grating element.
Figure 28:
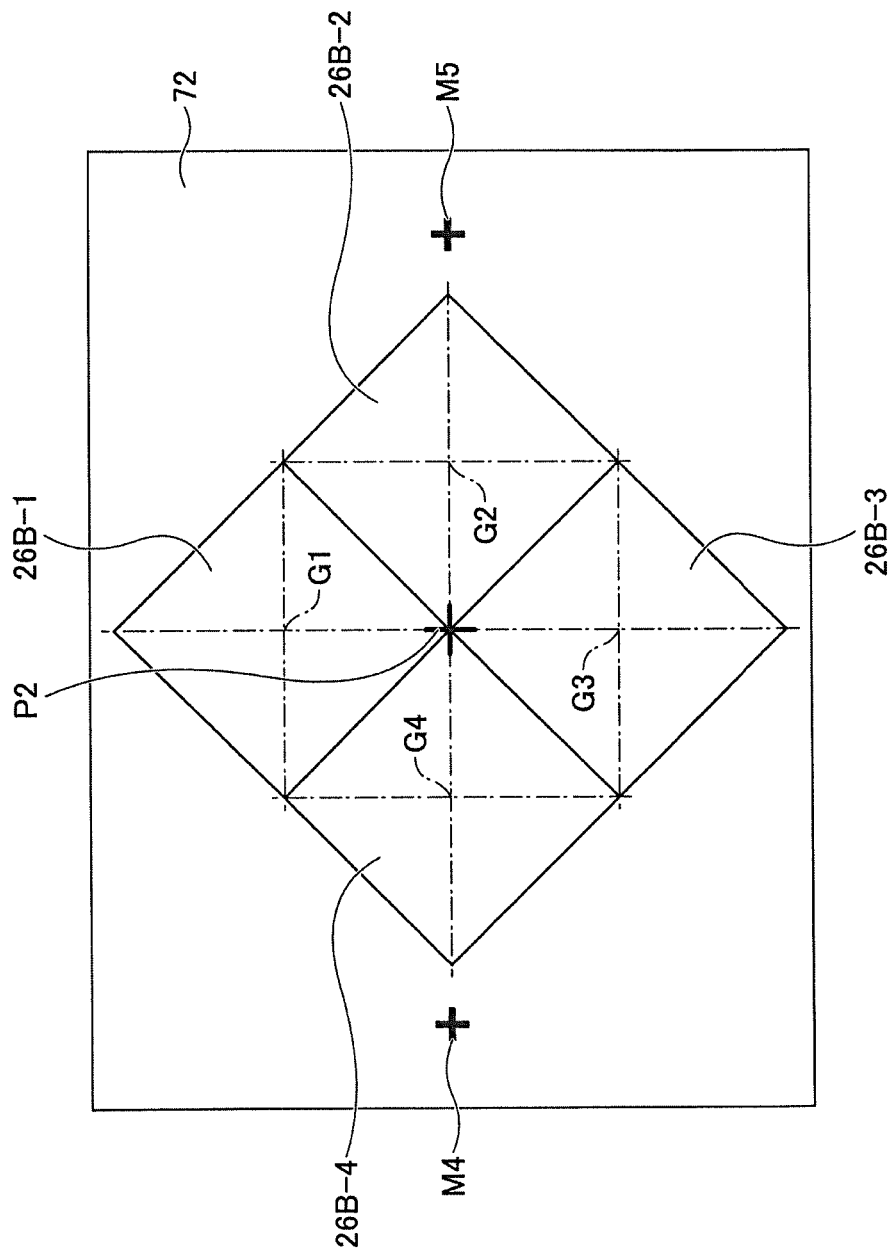
FIG. 28 is a diagram illustrating a variant of an arrangement of diffraction grating elements.

Further, in the embodiment described above, the diffraction grating element 26 has a rectangular outer shape; however, the outer shape of the diffraction grating element 26 is arbitrary. For example, the outer shape of the diffraction grating element 26 may be round, polygonal, an elliptical shape or the like, and may be star-shaped as diffraction grating elements 26A-1,26A-2 as illustrated in FIG. 27. It is noted that, in FIG. 27, the diffraction grating element substrate 72 has markers M2, M3 provided thereon. In the case where the diffraction grating element 26 has such an outline for which it is difficult to determine the centroid, it is preferable that markers such as markers M2, M3 are provided.

Further, in the embodiment described above, two diffraction grating elements 26-1, 26-2 provided for one diffraction grating element substrate 72 are spaced therebetween; however, this is not indispensable. Two diffraction grating elements 26-1, 26-2 may be provided in a seamless manner on the diffraction grating element substrate 72.

Further, in the embodiment described above, two diffraction grating elements 26-1, 26-2 are provided for one diffraction grating element substrate 72; however, this is not indispensable. For example, an even number of the diffraction grating elements, such as four, six, etc., may be provided for one diffraction grating element substrate 72. In this case, the same number of the light sources 25 are provided so that light sources 25 are paired with the diffraction grating elements 26 one by one. In this case, the midpoint alignment may be achieved by using a predetermined pair or arbitrary two pairs. In the example illustrated in FIG. 22, four diffraction grating elements 26B-1, 26B-2, 26B-3, and 26B-4 are formed continuously on the diffraction grating element substrate 72. In FIG. 22, centroids G1~G4 of the diffraction grating elements 26B-1, 26B-2, 26B-3, and 26B-4 are illustrated. In this case, the midpoint alignment may be implemented on the basis of a midpoint P2 between the centroid G3 of the diffraction grating element 26B-3 and the centroid G1 of the diffraction grating element 26B-1, for example.

In the above embodiment, the biological information is information related to a hand; however, this is not indispensable. For example, the biometric information of the target to be authenticated may be eye iris patterns or information relating to other body sites, such as facial features.

What is claimed is:

1. An illumination apparatus comprising:
    first and second light sources that generate light for an illumination area to be illuminated;
    a first substrate on which the first and second light sources are mounted; and
    a second substrate that is disposed in an illumination direction of the light of the first and second light sources with respect to the first substrate, the second substrate having first and second diffraction grating elements formed integrally therewith, the first diffraction grating element being provided for the first light source, and the second diffraction grating element being provided for the second light source,
    wherein a position of one of the first substrate and the second substrate relative to another of the first substrate and the second substrate is finely adjusted in a top view perpendicular to the first substrate,
    a first midpoint between two mounted positions of the first and second light sources on the first substrate and a second midpoint between two mounted positions of the first and second diffraction grating elements on the second substrate are matched in the top view, and
    a deviation of a position of a center of the first diffraction grating element on the second substrate from an optical axis of the first light source due to the mounted position of the first light source on the first substrate and a deviation of a position of a center of the second diffraction grating element on the second substrate from an optical axis of the second light source due to the mounted position of the second light source on the first substrate cancel each other to implement a uniform intensity distribution in the illumination area of a combination of light passing through the first diffraction grating element and light passing through the second diffraction grating element.

2. The illumination apparatus of claim 1, wherein the first and second diffraction grating elements each include diffraction gratings arranged in a two dimensional array.

3. The illumination apparatus of claim 2, wherein the diffraction gratings of the first diffraction grating element and the diffraction gratings of the second diffraction grating element are substantially the same and are arranged in substantially the same orientation and arrangement pattern.

4. The illumination apparatus of claim 2, wherein the diffraction gratings each have a plurality of grooves arranged in such a pattern that the grooves extend side by side in parallel straight lines.

5. The illumination apparatus of claim 1, wherein the first midpoint corresponds to a midpoint between a reference position based on an outline of the first light source and another reference position based on an outline of the second light source.

6. The illumination apparatus of claim 1, wherein the first midpoint corresponds to a midpoint between a position of a light emitting part of the first light source and a position of a light emitting part of the second light source.

7. The illumination apparatus of claim 1, wherein the second midpoint corresponds to a midpoint between a reference position based on an outline of the first diffraction grating element and another reference position based on an outline of the second diffraction grating element.

8. The illumination apparatus of claim 1, wherein the second substrate has a marker formed therein at a predetermined position with respect to the second midpoint.

9. The illumination apparatus of claim 1, wherein the first and second diffraction grating elements have characteristics such that optical strengths at an end of the illumination area on a first side become smaller in the case of mounting centers of the first and second diffraction grating elements on the second substrate being shifted to the first side with respect to optical axes of the first and second light sources than in the case of the mounting centers not being shifted.

10. The illumination apparatus of claim 9, wherein the characteristics are further such that the optical strengths at another end of the illumination area on a side opposite to the first side become greater in the case of the mounting centers being shifted to the first side than in the case of the mounting centers not being shifted.

11. The illumination apparatus of claim 1, wherein the second substrate is translucent.

12. The illumination apparatus of claim 1, wherein the first and second substrates are disposed substantially parallel, and
    the first and second light sources are offset to the same side with respect to the center of the illumination area.

13. An imaging apparatus comprising:
    an illumination apparatus configured to illuminate an illumination area with light; and
    an imaging optical system configured to capture an image of the illumination area,
    wherein the illumination apparatus includes:
    first and second light sources that generate the light for the illumination area to be illuminated;
    a first substrate on which the first and second light sources are mounted;
    first and second diffraction grating elements, the first diffraction grating element being provided for the first light source, and the second diffraction grating element being provided for the second light source; and
    a second substrate with which the first and second diffraction grating elements are formed integrally,
    wherein a position of one of the first substrate and the second substrate relative to another of the first substrate and the second substrate is finely adjusted in a top view perpendicular to the first substrate,
    a first midpoint between two mounted positions of the first and second light sources on the first substrate and a second midpoint between two mounted positions of the first and second diffraction grating elements on the second substrate are matched in the top view,
    a deviation of a position of a center of the first diffraction grating element on the second substrate from an optical axis of the first light source due to the mounted position of the first light source on the first substrate and a deviation of a position of a center of the second diffraction grating element on the second substrate from an optical axis of the second light source due to the mounted position of the second light source on the first substrate cancel each other to implement a uniform intensity distribution in the illumination area of a combination of light passing through the first diffraction grating element and light passing through the second diffraction grating element, and the imaging optical system is disposed in line with the first and second light sources.

14. A biometric authentication apparatus comprising:

an illumination apparatus configured to illuminate an illumination area with light;

an imaging optical system configured to capture an image of the illumination area; and an authentication part performing a biometric authentication based on the image captured by the imaging optical system, wherein the illumination apparatus includes:

first and second light sources that generate the light for the illumination area to be illuminated;

a first substrate on which the first and second light sources are mounted;

first and second diffraction grating elements, the first diffraction grating element being provided for the first light source, and the second diffraction grating element being provided for the second light source; and a second substrate with which the first and second diffraction grating elements are formed integrally, wherein a position of one of the first substrate and the second substrate relative to another of the first substrate and the second substrate is finely adjusted in a top view perpendicular to the first substrate, a first midpoint between two mounted positions of the first and second light sources on the first substrate and a second midpoint between two mounted positions of the first and second diffraction grating elements on the second substrate are matched in the top view, a deviation of a position of a center of the first diffraction grating element on the second substrate from an optical axis of the first light source due to the mounted position of the first light source on the first substrate and a deviation of a position of a center of the second diffraction grating element on the second substrate from an optical axis of the second light source due to the mounted position of the second light source on the first substrate cancel each other to implement a uniform intensity distribution in the illumination area of a combination of light passing through the first diffraction grating element and light passing through the second diffraction grating element, and the imaging optical system is disposed in line with the first and second light sources.

15. The biometric authentication apparatus of claim 14, wherein the first and second light sources are offset to the same side with respect to the center of the illumination area.

* * * * *